(12) United States Patent
Watanabe et al.

(10) Patent No.: US 7,328,168 B2
(45) Date of Patent: Feb. 5, 2008

(54) DAILY DELIVERED ARTICLES ORDER OPTIMIZATION SUPPORT SYSTEM, METHOD, AND STORAGE MEDIUM THEREFOR

(75) Inventors: Minami Watanabe, Tokyo (JP); Tetsuya Shindo, Tokyo (JP); Ikuko Fukutani, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 1193 days.

(21) Appl. No.: 10/102,821

(22) Filed: Mar. 22, 2002

(65) Prior Publication Data

US 2002/0165761 A1 Nov. 7, 2002

(30) Foreign Application Priority Data

Mar. 29, 2001 (JP) ............................. 2001-097105

(51) Int. Cl.
*G06F 9/44* (2006.01)
(52) U.S. Cl. .................................................. 705/7
(58) Field of Classification Search ................ 705/7, 705/10
See application file for complete search history.

(56) References Cited

U.S. PATENT DOCUMENTS

| | | | | |
|---|---|---|---|---|
| 5,128,861 A | * | 7/1992 | Kagami et al. ................. | 705/10 |
| 5,946,662 A | * | 8/1999 | Ettl et al. ........................ | 705/8 |
| 6,006,202 A | * | 12/1999 | Ramaswamy et al. ......... | 705/28 |
| 6,341,269 B1 | * | 1/2002 | Dulaney et al. ............... | 705/22 |
| 6,609,101 B1 | * | 8/2003 | Landvater ...................... | 705/10 |

FOREIGN PATENT DOCUMENTS

| | | |
|---|---|---|
| JP | 09-34955 | 2/1997 |
| JP | 09-198448 | 7/1997 |
| JP | 10-307808 | 11/1998 |
| JP | 2000-123255 | 4/2000 |
| WO | WO 9715023 A2 * | 4/1997 |

OTHER PUBLICATIONS

Gunasekaren et al (Modelling and analysis of supply chain management systems: an editorial overview) Dec. 2000, University of Massachussets, USA, pp. 1112-1115.*
Ashayeri et al (Order selection optimization in hybrid make-to-order and make-to-stock markets), 2001, Journal of the Operational Research Society, pp. 1098-1106.*

* cited by examiner

*Primary Examiner*—Romain Jeanty
(74) *Attorney, Agent, or Firm*—Staas & Halsey LLP

(57) ABSTRACT

An estimated shortfall by article and time period is first computed. Then, based on the estimated shortfall, etc., an expected profit of each of the first through m-th ordered pieces of each article is computed, and sorted in order from the highest expected profit. Based on the sorting result, for example, an order pattern with which the highest profit can be expected in the order budget is presented. The above mentioned process can be separately performed between weekdays and holidays if the sales characteristics are different between them.

9 Claims, 25 Drawing Sheets

FIG. 6A — SALES DETAILS TABLE

| YEAR/MONTH /DAY | TIME | ARTICLE NUMBER ID | ARTICLE NUMBER NAME | ARTICLE GROUP NUMBER ID | ARTICLE GROUP NAME | ARTICLE ID | ARTICLE NAME | SALES VOLUME | SALES AMOUNT |
|---|---|---|---|---|---|---|---|---|---|
| 1999/6/1 | 0 | 6 | BOX LUNCH | 63 | LUNCH BOX IN THIRD DELIVERY | 1063 | WHITE RICE | 1 | 200 |
| 1999/6/1 | 1 | 4 | RICE BALL | 41 | RICE BALL IN FIRST DELIVERY | 1041 | RED SALMON | 1 | 90 |
| 1999/6/1 | 2 | 4 | RICE BALL | 41 | RICE BALL IN FIRST DELIVERY | 1042 | LEAF MUSTERD | 1 | 90 |
| 1999/6/1 | 3 | 6 | BOX LUNCH | 63 | LUNCH BOX IN THIRD DELIVERY | 1054 | MIXED SEAWEED | 1 | 200 |
| . | . | . | . | . | . | . | . | . | . |

FIG. 6B — WEEKDAY/HOLIDAY TOTAL DAILY SALES VOLUME TABLE (11, 21)

| No. | YEAR/MONTH/DAY | TOTAL SALES | TOTAL ARTICLE SALES AMOUNT | WEEK-OF-DAY | WEEKDAY/HOLIDAYS FLAG |
|---|---|---|---|---|---|
| 1 | 1999/6/1 | 115 | 2000 | 3 | 0 |
| 2 | 1999/6/2 | 127 | 1300 | 4 | 0 |
| 3 | 1999/6/3 | 232 | 2000 | 5 | 0 |
| 4 | 1999/6/4 | 129 | 3300 | 6 | 0 |
| 5 | 1999/6/5 | 501 | 12300 | 7 | 1 |
| . | | | | | . |

FIG. 6C — WEEKDAY/HOLIDAY TOTAL SALES SHARE BY TIME PERIOD TABLE (22)

| TIME PERIOD | 0:00 | 1:00 | 2:00 | 3:00 | 4:00 | 5:00 | 6:00 |
|---|---|---|---|---|---|---|---|
| WEEKDAYS | 0.03 | 0.02 | 0.02 | 0.02 | 0.01 | 0.01 | 0.02 |
| HOLIDAYS | 0.03 | 0.02 | 0.02 | 0.02 | 0.02 | 0.02 | 0.03 |

WEEKDAY/HOLIDAY TOTAL SALES VOLUME BY TIME PERIOD TABLE

| No. | TIME | TOTAL SALES | TOTAL ARTICLE SALES AMOUNT | WEEKDAY/ HOLIDAYS FLAG |
|---|---|---|---|---|
| 1 | 0 | 11 | 2000 | 0 |
| 2 | 2 | 12 | 1300 | 0 |
| 3 | 3 | 23 | 2000 | 0 |
| 4 | 4 | 12 | 3300 | . |
| . | | | | |

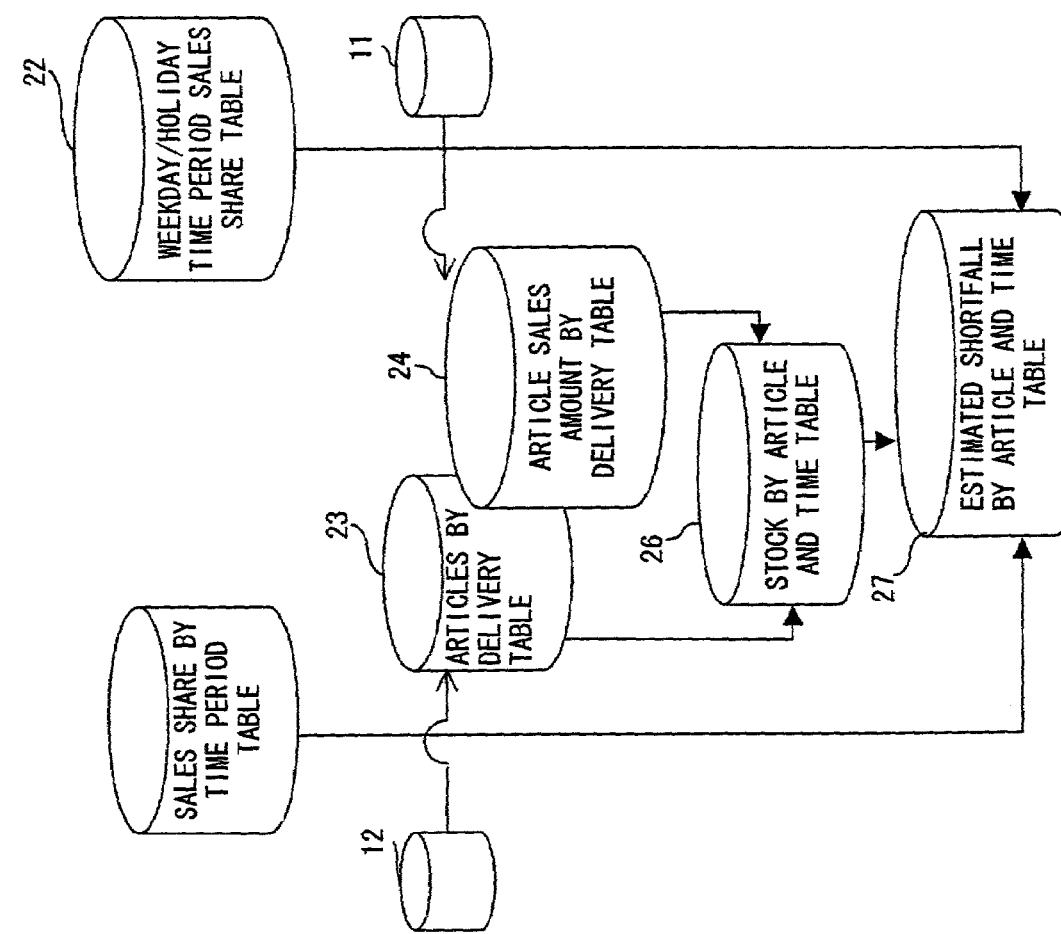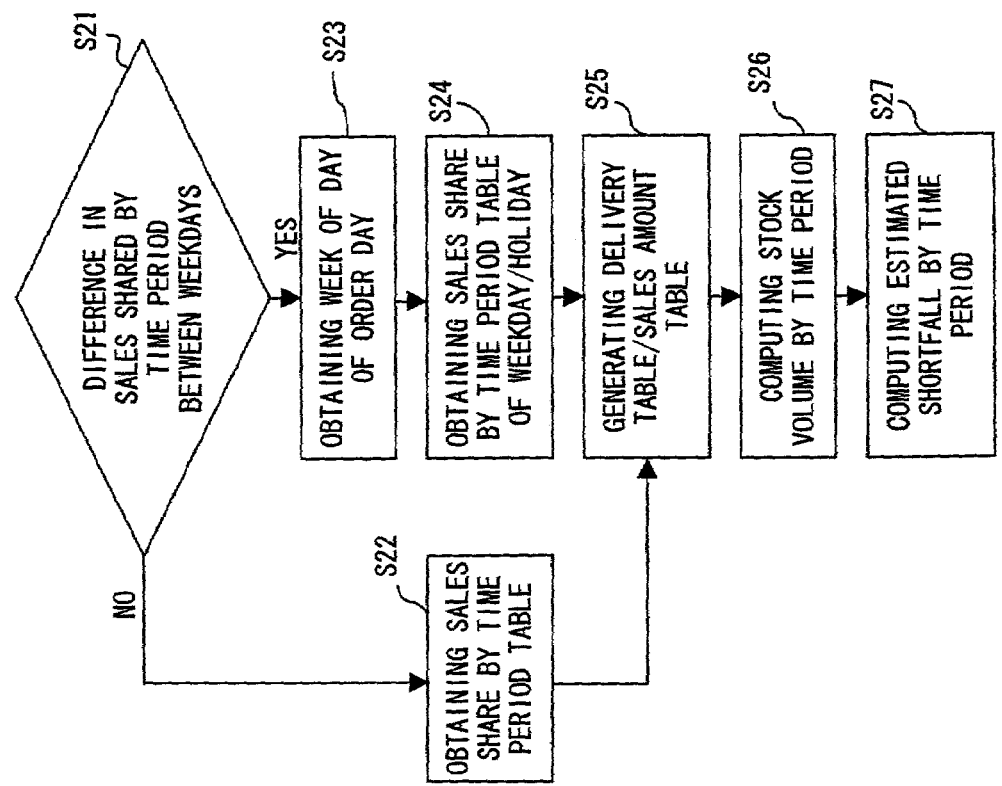
FIG. 7

| NO. | DAY | DELIVERY | ARTICLE ID | ARTICLE NAME | DELIVERY VOLUME | SALES PRICE |
|---|---|---|---|---|---|---|
| 1 | 01 | 3 | 1023 | RICE | 6 | 110 |
| 2 | 01 | 1 | 1232 | CURRY | 5 | 130 |
| 3 | 01 | 1 | 1324 | LEAF MUSTARD | 5 | 200 |
| 4 | 01 | 3 | 1639 | BOWL OF RICE WITH FRIED PORK CUTLET ON TOP | 3 | 330 |
| . | . | . | . | . | . | . |

DELIVERY TABLE BY DAY, TIME, AND DELIVERY

F I G. 8 A

| NO. | DAY | DELIVERY | ARTICLE ID | ARTICLE NAME | DELIVERY VOLUME | SALES PRICE |
|---|---|---|---|---|---|---|
| 1 | 0100 | 3 | 1023 | RICE | 1 | 110 |
| 2 | 0102 | 1 | 1232 | CURRY | 1 | 130 |
| 3 | 0102 | 1 | 1324 | LEAF MUSTARD | 2 | 200 |
| 4 | 0102 | 3 | 1639 | BOWL OF RICE WITH FRIED PORK CUTLET ON TOP | 1 | 330 |
| . | . | . | . | . | . | . |

ARTICLE SALES AMOUNT TABLE BY DAY, TIME AND DELIVERY

F I G. 8 B

- DELIVERY TIME
  FIRST DELIVERY..1:00
  SECOND DELIVERY..10:00
  THIRD DELIVERY..17:00
- DISCARD TIME
  FIRST DELIVERY..16:00
  SECOND DELIVERY..0:00
  THIRD DELIVERY..10:00
AS A RESULT, SALES TIMES ARE DETERMINED AS FOLLOWS.
  FIRST DELIVERY..1:00 THROUGH 16:00
  SECOND DELIVERY..10:00 THROUGH 0:00 NEXT DAY
  THIRD DELIVERY..17:00 THROUGH 10:00 NEXT MORNING
- CURRENT STOCK VOLUME = PREVIOUS STOCK + DELIVERY VOLUME OF CURRENT DELIVERY − CURRENT SALES VOLUME
HOWEVER, INITIAL STOCK IS SET AS FOLLOWS.
- FIRST DELIVERY..0 PIECE
- SECOND DELIVERY.. SALES VOLUME AT 0:00
- THIRD DELIVERY.. TOTAL SALES VOLUME FROM 0:00 TO 10:00

|  |  | 0 | 1 | 2 | ... | 10 | 11 | ... | 16 | 17 | ... | 23 |
|---|---|---|---|---|---|---|---|---|---|---|---|---|
| FIRST DELIVERY | DELIVERY |  | DELIVERY |  |  |  |  |  |  |  |  |  |
| 61 | SALES |  |  |  |  |  |  |  |  |  |  |  |
| 62 | DISCARD | DISCARD |  |  |  |  |  |  | DISCARD |  |  |  |
| 63 | STOCK | 0 |  |  |  |  |  |  | 0 |  |  |  |
| 64 |  |  |  |  |  |  |  |  |  |  |  |  |
| SECOND DELIVERY | DELIVERY |  |  |  |  | DELIVERY |  |  |  |  |  |  |
| 65 | SALES |  |  |  |  |  |  |  |  |  |  |  |
| 66 | DISCARD | DISCARD |  |  |  |  |  |  |  |  |  |  |
| 67 | STOCK | 0 |  |  |  |  |  |  |  |  |  |  |
| 68 |  |  |  |  |  |  |  |  |  |  |  |  |
| THIRD DELIVERY | DELIVERY |  |  |  |  |  |  |  |  | DELIVERY |  |  |
| 69 | SALES |  |  |  |  |  |  |  |  |  |  |  |
| 70 | DISCARD |  |  |  |  | DISCARD |  |  |  |  |  |  |
| 71 | STOCK |  |  |  |  | 0 |  |  |  |  |  |  |
| 72 |  |  |  |  |  |  |  |  |  |  |  |  |
| TOTAL | DELIVERY |  | FIRST DELIVERY |  |  | SECOND DELIVERY |  |  | FIRST DELIVERY | THIRD DELIVERY |  |  |
| 73 | SALES | SECOND DELIVERY |  |  |  | THIRD DELIVERY |  |  |  |  |  |  |
| 74 | DISCARD |  |  |  |  |  |  |  |  |  |  |  |
|  | STOCK |  |  |  |  |  |  |  |  |  |  |  |

FIG. 9

EXAMPLE

| | ... | 10:00 | 11:00 | 12:00 | 13:00 | 14:00 | ... |
|---|---|---|---|---|---|---|---|
| SHARE (75) | ... | 0.1 | 0.1 | 0.2 | 0.07 | 0.05 | ... |
| STOCK VOLUME (74) | | 5 | 3 | 0 | 0 | 0 | |
| SALES (73) | | 0 | 2 | 3 | 0 | 0 | |

SINCE TWO AND THREE PIECES ARE SOLD RESPECTIVELY AT 10:00 AND 12:00,

ESTIMATED SHORTFALL AT 13:00 = (2 + 3) / (0.1 + 0.1) × 0.07 = 1.75 PIECES

ESTIMATED SHORTFALL AT 14:00 = (2 + 3) / (0.1 + 0.1) × 0.05 = 1.25 PIECES

SINCE THERE IS A STOCK AT 10:00 AND 11:00, ESTIMATED SHORTFALL IS 0 PIECE.

FIG. 10

| 27 ↓ | 0 | 1 | 2 | ... | n | ... | 16 | 17 | ... | 23 |
|---|---|---|---|---|---|---|---|---|---|---|
| 81 (a) STOCK FLAG | $F_0$ | $F_1$ | $F_2$ | ... | $F_n$ | ... | $F_{16}$ | $F_{17}$ | ... | $F_{23}$ |
| 82 (b) TIME PERIOD SHARE | $S_0$ | $S_1$ | $S_2$ | ... | $S_n$ | ... | $S_{16}$ | $S_{17}$ | ... | $S_{23}$ |
| 83 (c) = (a) × (b) | | | | | | | | | | |
| 84 ORDER VOLUME (= DELIVERY) | | | | | | | | | | |
| 85 (d) SALES VOLUME (SALES) | $H_0$ | $H_1$ | $H_2$ | ... | $H_n$ | ... | $H_{16}$ | $H_{17}$ | ... | $H_{23}$ |
| 86 DISCARD VOLUME | | | | | | | | | | |
| 87 (e) ESTIMATED SHORTFALL | $K_0$ | $K_1$ | $K_2$ | ... | $K_n$ | ... | $K_{16}$ | $K_{17}$ | ... | $K_{23}$ |

- (a) STOCK FLAG 81
  - 0 WHEN THERE IS NO STOCK
  - 1 WHEN THERE IS STOCK
- (e) ESTIMATED SHORTFALL (Kn) 87
  ESTIMATED SHORTFALL (Kn) = −1 × (Fn−1) × Sn × Σ (d) / Σ (c) − Hn
  (Kn = 0 WHEN Kn <= 0)

(NOTE) • SHORTFALL AT TIME PERIOD WHERE THERE IS SALES VOLUME IS 0.
• WHEN TOTAL SALES VOLUME IN 24 HOURS (1 DAY) IS 0,
  SHORTFALL OF DAY IS 0.

| | ITEM | SALES DAYS | TOTAL ORDER VOLUME | TOTAL ACTUAL SALES VOLUME | SALES VOLUME PER DAY | TOTAL DISCARD VOLUME | TOTAL SHORT FALLS | TOTAL DEMAND VOLUME | TOTAL DEMAND VOLUME PER DAY | POTENTIA LITY |
|---|---|---|---|---|---|---|---|---|---|---|
| 1 | LUNCH BOX G | 0 | 0 | 0 | 0 | 0 | 0 | 0 | 0 | 0 |
| 2 | RICE BALL I | 0 | 0 | 0 | 0 | 0 | 0 | 0 | 0 | 0 |
| 3 | RICE BALL J | 3 | 6 | 6 | 2 | 0 | 24.2 | 30.2 | 10.07 | 5.03 |
| 4 | RICE BALL K | 12 | 73 | 66 | 5.5 | 6 | 38.16 | 104.16 | 8.68 | 1.58 |
| 5 | LUNCH BOX A | 15 | 280 | 190 | 12.67 | 79 | 4.07 | 194.07 | 12.94 | 1.02 |
| 6 | LUNCH BOX B | 1 | 2 | 1 | 1 | 0 | 1.61 | 2.61 | 2.61 | 2.61 |
| 7 | LUNCH BOX C | 9 | 23 | 21 | 2.33 | 0 | 77.91 | 98.91 | 10.99 | 4.71 |
| 8 | LUNCH BOX D | 15 | 77 | 74 | 4.93 | 3 | 44.46 | 118.46 | 7.9 | 1.6 |
| 9 | LUNCH BOX E | 12 | 36 | 34 | 2.83 | 4 | 55.69 | 89.69 | 7.47 | 2.64 |

91 92 93 94 95 96 97 98 99
28

| No. | ARTICLE ID | ARTICLE NAME | COST | SALES PRICE | GROSS PROFIT |
|---|---|---|---|---|---|
| 1 | 1026 | BOWL OF RICE WITH ROASTED EEL ON TOP | 100 | 230 | 130 |
| 2 | 1232 | LUNCH BOX WITH SEAWEED | 80 | 150 | 60 |
| 3 | 1032 | OMELET CONTAINING FRIED RICE AS A FILLING, SEASONED WITH KETCHUP | 90 | 200 | 110 |
| 4 | 1545 | HAMBURGER STEAK | 100 | 250 | 150 |
| . | . | . | . | . | . |

ARTICLE COST TABLE

FIG. 16

| DELIVERY NUMBER | — | ARTICLE NAME | SALES PRICE | COST | GROSS PROFIT | 1 | 2 | 3 | 4 | 5 | ... |
|---|---|---|---|---|---|---|---|---|---|---|---|
| 1 | 1 | LUNCH BOX G | 650 | 442 | 208 | 0.00 | 0.00 | 0.00 | 0.00 | 0.00 | |
| | 2 | RICE BALL I | 220 | 140.8 | 79.2 | 0.00 | 0.00 | 0.00 | 0.00 | 0.00 | |
| | 3 | RICE BALL J | 240 | 156 | 84 | 51.50 | 37.69 | 20.79 | 1.20 | -20.23 | |
| | 4 | RICE BALL K | 260 | 169 | 91 | 76.33 | 63.17 | 43.10 | 15.85 | -17.07 | |
| | 5 | LUNCH BOX A | 450 | 297 | 153 | 145.01 | 131.55 | 104.05 | 57.44 | -8.15 | |
| | 6 | LUNCH BOX B | 350 | 229.25 | 120.75 | 0.00 | 0.00 | 0.00 | 0.00 | 0.00 | |
| | 7 | LUNCH BOX C | 480 | 316.8 | 163.2 | 89.90 | 61.39 | 27.27 | -11.54 | -53.51 | |
| | 8 | LUNCH BOX D | 380 | 250.8 | 129.2 | 102.89 | 77.62 | 39.36 | -10.80 | -67.74 | |
| | 9 | LUNCH BOX E | 480 | 312 | 168 | 75.78 | 31.76 | -20.27 | -76.91 | -133.01 | |
| | 10 | LUNCH BOX F | 390 | 253.5 | 136.5 | 76.99 | 52.91 | 23.96 | -9.00 | -44.54 | |

| DERIVERY NAME | — | ARTICLE NAME | SALES PRICE | COST | GROSS PROFIT | N-TH ORDERED PIECE | EXPECTED PROFIT RATE | CUMULATIVE ORDER AMOUNT |
|---|---|---|---|---|---|---|---|---|
| 1 | 41 | RICE BALL A | 130 | 84.5 | 45.5 | 1 | 0.34 | 130 |
|  | 45 | RICE BALL B | 130 | 85.8 | 44.2 | 1 | 0.33 | 260 |
|  | 51 | RICE BALL C | 120 | 78 | 42 | 1 | 0.33 | 380 |
|  | 32 | RICE BALL D | 120 | 80.4 | 39.6 | 1 | 0.33 | 500 |
|  | 30 | RICE BALL E | 120 | 78 | 42 | 1 | 0.33 | 620 |
|  | 32 | RICE BALL D | 120 | 80.4 | 39.6 | 2 | 0.33 | 740 |
|  | 47 | RICE BALL F | 100 | 65 | 35 | 1 | 0.33 | 840 |
|  | 45 | RICE BALL B | 130 | 85.8 | 44.2 | 2 | 0.32 | 970 |
|  | 5 | LUNCH BOX A | 450 | 297 | 153 | 1 | 0.32 | 1420 |

| DELIVERY NAME | — 121 | ARTICLE NAME 122 | SALES PRICE 123 | COST 124 | GROSS PROFIT 125 | OPTIMUM ORDER VOLUME 126 | ACTUAL ORDER VOLUME 127 |
|---|---|---|---|---|---|---|---|
| 1 | 41 | RICE BALL A | 130 | 84.5 | 45.5 | 1 | 2 |
| | 45 | RICE BALL B | 130 | 85.8 | 44.2 | 2 | 2 |
| | 51 | RICE BALL C | 120 | 78 | 42 | 1 | 1 |
| | 32 | RICE BALL D | 120 | 80.4 | 39.6 | 2 | 2 |
| | 30 | RICE BALL E | 120 | 78 | 42 | 1 | 1 |
| | 47 | RICE BALL F | 100 | 65 | 35 | 1 | 1 |

33

↗ (arrow pointing to table)

COST STRUCTURE AND PAST SALES RESULT

| | SALES PRICE | PURCHASE COST | GROSS PROFIT | FIRST DAY | SECOND DAY | THIRD DAY | FOURTH DAY | FIFTH DAY | AVERAGE $\mu$ | VARIANCE $\sigma$ |
|---|---|---|---|---|---|---|---|---|---|---|
| LUNCH BOX A | ¥1,000 | ¥700 | ¥300 | 5 | 5 | 5 | 5 | 5 | 5 | 1E-10 |
| LUNCH BOX B | ¥1,000 | ¥700 | ¥300 | 3 | 5 | 6 | 6 | 7 | 5 | 1.5811388 |

FIG. 23B

SALES PROBABILITY

| ARTICLE NAME \ N-TH ORDERED PIECE | 1 PIECE | 2 PIECES | 3 PIECES | 4 PIECES | 5 PIECES | 6 PIECES | 7 PIECES | 8 PIECES | 9 PIECES |
|---|---|---|---|---|---|---|---|---|---|
| LUNCH BOX A | 1 | 1 | 1 | 1 | 0.5 | 0 | 0 | 0 | 0 |
| LUNCH BOX B | 0.994294 | 0.97111 | 0.897048 | 0.736455 | 0.5 | 0.263545 | 0.102952 | 0.02889 | 0.005706 |

FIG. 23C

EXPECTED PROFIT RATE TABLE

| ARTICLE NAME \ N-TH ORDERED PIECE | 1 PIECE | 2 PIECES | 3 PIECES | 4 PIECES | 5 PIECES | 6 PIECES | 7 PIECES | 8 PIECES | 9 PIECES |
|---|---|---|---|---|---|---|---|---|---|
| LUNCH BOX A | 1 | 1 | 1 | 1 | 0.3 | -0.7 | -0.7 | -0.7 | -0.7 |
| LUNCH BOX B | 0.273732 | 0.203824 | 0.045102 | -0.20406 | -0.47599 | -0.68343 | -0.79456 | -0.83648 | -0.84829 |

FIG. 23D

ORDER PRIORITY TABLE

| No. | ARTICLE NAME | N-TH ORDERED PIECE | COST | EXPECTED PROFIT RATE | CUMULATIVE ORDER AMOUNT |
|---|---|---|---|---|---|
| 1 | LUNCH BOX A | 1 | 300 | 0.3 | 300 |
| 2 | LUNCH BOX A | 2 | 300 | 0.3 | 600 |
| 3 | LUNCH BOX A | 3 | 300 | 0.3 | 900 |
| 4 | LUNCH BOX A | 4 | 300 | 0.3 | 1200 |
| 5 | LUNCH BOX B | 1 | 240 | 0.273732 | 1440 |
| 6 | LUNCH BOX B | 2 | 240 | 0.203824 | 1680 |
| 7 | LUNCH BOX B | 3 | 240 | 0.045102 | 1920 |
| 8 | LUNCH BOX A | 5 | 300 | -0.2 | 2220 |
| 9 | LUNCH BOX B | 4 | 240 | -0.20406 | 2460 |
| ... | | | | | |

FIG. 23E

OPTIMUM ORDER VOLUME

| ARTICLE NAME | OPTIMUM ORDER VOLUME | ORDER VOLUME |
|---|---|---|
| LUNCH BOX A | | 4 |
| LUNCH BOX B | | 2 |
| ... | | |

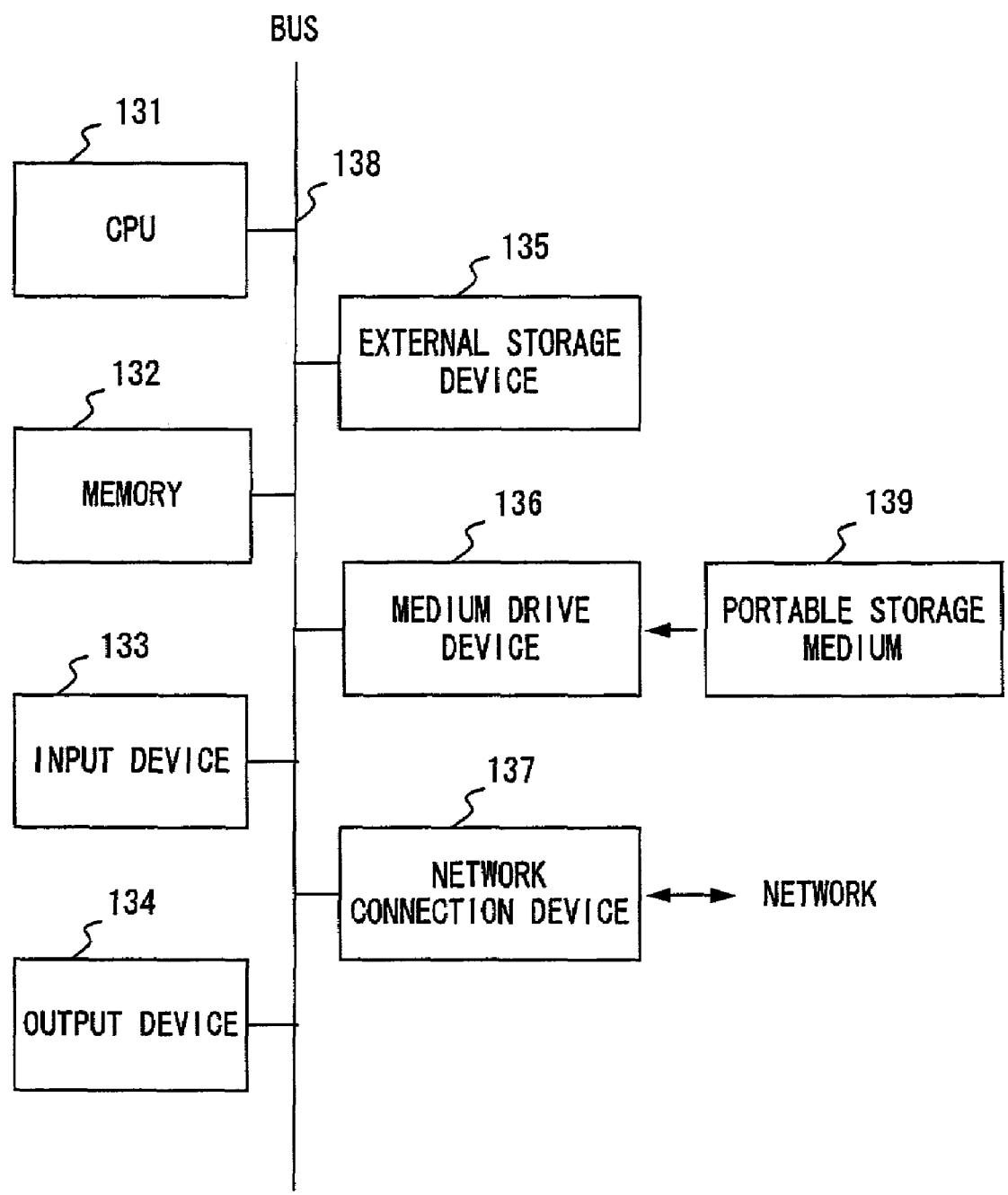
F I G. 24

DAILY DELIVERED ARTICLES ORDER OPTIMIZATION SUPPORT SYSTEM, METHOD, AND STORAGE MEDIUM THEREFOR

BACKGROUND OF THE INVENTION

1. Field of the Invention

The present invention relates to a system and a method for determining the optimum order in article and volume, and supporting the management of top sellers and shelf warmers.

2. Description of the Related Art

Conventionally, for example, in convenience stores, etc., the articles(merchandise) management in each store has been performed on top sellers and shelf warmers based on the sales results (actual sales volume) especially for daily delivered articles (lunch boxes, rice balls, other fresh articles, etc. which are fundamentally ordered and delivered every day).

Normally, orders have been placed on the daily delivered articles by a person in charge. That is, the variations of items(merchandise) are determined by the person in charge. The estimate of volume of each article is determined based on the sales results of the past, for example, the day before, the week before, etc. The volume adjustment has been made based on the clearance determination by trial and error by a person in charge. The influence of the volume in the previous delivery on the current delivery (due to the overlapping sales periods (from delivery time to sell-by time)) has also been taken into account by the person in charge.

The management of top sellers and shelf warmers and the estimate of volume are performed based on the sales results of the past. For example, if the order volume of an article is 5 and the sales result of the article is 5, then the article could have been sold more if the order volume had been larger (that is, there can be a loss of sales opportunities). On the other hand, if the order volume is too large, there can be unsold articles to be wastefully discarded (that is, there can be a loss due to the discarding process).

However, the sales trend of each article depends on each store, and the sales trends of various articles are different from one another in the same store day by day, thereby making it difficult for a person in charge to appropriately determine the order volume of each article through experience or by trial and error. Furthermore, it takes a long time to determine the optimum order volume for each article.

To solve the problem of the variations in optimum order volume (to solve the problem of uncertain variations), for example, there is a method for optimally estimating the sales volume of each article by analyzing the factors of variations, reducing the variations, and quantifying the influence of the variations using the regression analysis, the tree analysis, etc.

However, in the approach of estimating the sales volume as described above, it is very difficult for the following reasons to generate an estimated model capable of outputting a high-precision estimate.

- A large volume of data cannot be obtained on the same condition (The conditions are different between today and yesterday, between stores, etc., thereby hardening the settings on the same condition.)
- There are no sufficient probable factors for the variations (for example, detailed attributes of lunch boxes, etc.).

SUMMARY OF THE INVENTION

The present invention has been developed to provide a daily delivered articles order optimization support system, method, and storage medium capable of presenting an optimum profit-making order pattern (presenting the optimum volume for each article), thereby easily determining the volume of each article when an order is placed, reducing the loss of sales opportunities, and appropriately managing top sellers and shelf warmers.

The daily delivered articles order optimization support system according to the present invention includes: an expected-profit-sequenced order priority generation unit for computing the expected profit of each piece of article up to the specified number for each article based on the sales result data in the latest period of the past, and sorting the articles in order from the highest expected profit in the computation results of all articles; and an optimum order pattern computation unit for computing the optimum order pattern based on the process result of the expected-profit-sequenced order priority generation unit.

The daily delivered articles order optimization support system can compute an order pattern (order volume of each article) in which the largest profit can be obtained from the entire articles. The user can be presented with the optimum profit-making order pattern (order volume of each article), thereby determining an appropriate order pattern by referring to the presentation. In addition, by using the profit-making computing method, a profit-making swapping process can be performed between the articles of different categories or price zones (for example, between lunch boxes at 800 yen apiece and rice balls at 100 yen apiece).

Additionally, for example, the daily delivered articles order optimization support system can also be configured by a sales share analysis unit for obtaining the sales share by time period based on the sales result data in the latest period of the past; and an estimated shortfall computation unit for computing the estimated shortfall by time period based on the sales share by time period, the sales result data in the latest period of the past, the delivery volume of each article in each delivery, and the set delivery/discard time of each delivery.

In this case, the expected-profit-sequenced order priority generation unit computes the expected profit based on the sales result data and the estimated shortfall by time period, thereby figuring out an order pattern with which the largest profit can be expected with a loss of sales opportunities reduced.

In addition, for example, the expected profit can also be computed with the estimated carry-over from the previous delivery computed in the previous process taken into account.

In this process, the carry-over to the next delivery is computed. In computing the expected profit for the next delivery (in this example, the current delivery to be processed this time), an amendment is made such that the larger the carry-over from the previous delivery is, the less expected profit the article can make. As a result of computing an order pattern, an adjustment of the order volume can be automatically made with the influence of the carry-over from the previous delivery taken into account, thereby flexibly taking measures upon receipt of a change in delivery schedule or in demand time period.

Additionally, for example, the daily delivered articles order optimization support system with the above mentioned configuration can be further configured by a week-of-day characteristic analysis unit for determining whether the sales characteristic depends on holiday or weekday, or any day of a week based on the sales result data in the latest period of the past.

If the week-of-day characteristic analysis unit determines that the sales characteristic depends on a holiday or a weekday, or any day of a week, then the expected-profit-sequenced order priority generation unit and/or the estimated shortfall computation unit performs a process based on the sales result data in the latest period of the past by holiday or weekday, or any day of a week, and/or based on the sales share by time period.

In the above mentioned system, for example, when the sales characteristic depends on holiday or weekday, and when the day of the delivery to be processed is a holiday, the process is performed based on the sales result data of the past holidays and the sales share by time period of a holiday, thereby obtaining a high-precision process result.

The daily delivered articles order optimization support system according to another aspect of the present invention is configured by: a sales share analysis unit for obtaining a sales share by time period based on the sales result data in the latest period of the past; an estimated shortfall computation unit for computing an estimated shortfall by time period based on the sales share by time period, the sales result data in the latest period of the past, the delivery volume of each delivery, and the set delivery/discard time of each delivery; and a potentiality computation unit for computing and displaying the potentiality of an article using an estimated shortfall by time period.

A larger value of the potentiality indicates an article having a larger loss of sales opportunities. The user can refer to the value to easily and appropriately determine the increase or decrease in the order volume of each article.

Furthermore, for example, a higher-precision process result can be obtained by the determination of the week-of-day characteristic analysis unit.

The daily delivered articles order optimization support method according to the present invention includes: computing the expected profit of each piece of article up to the specified number for each article based on the sales result data in the latest period of the past, and sorting the articles in order from the highest expected profit in the computation results of all articles; and computing the optimum order pattern based on the sorting result.

The daily delivered articles order optimization support method according to another aspect of the present invention is configured by: obtaining a sales share by time period based on the sales result data in the latest period of the past; computing an estimated shortfall by time period based on the sales share by time period, the sales result data in the latest period of the past, the delivery volume of each delivery, and the set delivery/discard time of each delivery; and computing and displaying the potentiality of an article using an estimated shortfall by time period.

A computer-readable storage medium storing a program for directing a computer to perform the process of: computing the expected profit of each piece of article up to the specified number for each article based on the sales result data in the latest period of the past, and sorting the articles in order from the highest expected profit in the computation results of all articles; and computing the optimum order pattern based on the sorting result.

A computer-readable storage medium storing a program for directing a computer to perform the process of: obtaining a sales share by time period based on the sales result data in the latest period of the past; computing an estimated shortfall by time period based on the sales share by time period, the sales result data in the latest period of the past, the delivery volume of each delivery, and the set delivery/discard time of each delivery; and computing and displaying the potentiality of an article using an estimated shortfall by time period.

BRIEF DESCRIPTION OF THE DRAWINGS

FIG. 6A shows an example of a sales details table, FIG. 6B shows an example of a weekday/holiday total sales table, and FIG. 6C shows an example of a weekday/holiday time period sales share table;

FIG. 7 is a detailed flowchart of the process C;

FIG. 8A shows an example of an articles by delivery table, and FIG. 8B shows an example of an article sales amount by delivery table;

FIG. 9 shows the computation of the stock in each time period;

FIG. 10 is a general explanatory view showing an example of the method of computing an estimated shortfall by time;

FIG. 11 shows an example of a shortfall table by article and time and an example of the method of computing the estimated shortfall;

FIG. 13 shows an example of a potentiality table by article;

FIG. 16 shows an example of a articles cost table;

FIG. 17 shows an example of an expected profit rate table;

FIG. 19 shows an example of an all articles sort result table (order priority table);

FIG. 21 shows an example of an order simulation result table;

FIG. 22 shows an example of displaying an order simulation result;

FIGS. 23A through 23E are views for explanation of the process of determining the optimum order volume and the actual order volume by generating the order priority table using a simple example to generate an order priority table through computation of an expected profit rate;

FIG. 24 shows an example of a hardware configuration of an information processing device for realizing the daily delivered articles order optimization support system according to an embodiment of the present invention.

DESCRIPTION OF THE PREFERRED EMBODIMENT

The present embodiment makes an approach not to estimate the sales volume of each article by solving the factors of the variations and removing the variations and quantify the influence of the variations, but to adopt the best strategy of taking variations into account (using the methods of a probability distribution analysis, a linear plan, a secondary plan, etc.). The first feature resides in that, by setting the object variable as an expected profit (indicating at least one of the expected profit amount and the expected profit rate), an order pattern in which the largest profit can be expected from all articles is presented to a user, and the user can be supported to place an appropriate order based on the presented order pattern. Furthermore, the user can be supported to place a more appropriate order by performing a process of quantifying a loss of sales opportunities due to a shortfall and estimating a carry-over from the previous delivery.

The second feature of the present invention resides in that the estimated shortfall is computed for each article, the potentiality (the larger the value is, the larger loss of sales opportunities the article has) of each article is computed/displayed, and the user increases the order volume of an article having higher potentiality, thereby reducing the loss of sales opportunities.

The embodiment of the present invention is described below by referring to the attached drawings.

In the following explanation, for example, such articles as lunch boxes, rice balls, etc. sold in convenience stores, etc. are described as examples, but the object articles are not limited to those sold in convenience stores, and can be any other daily delivered articles.

Figure 1:
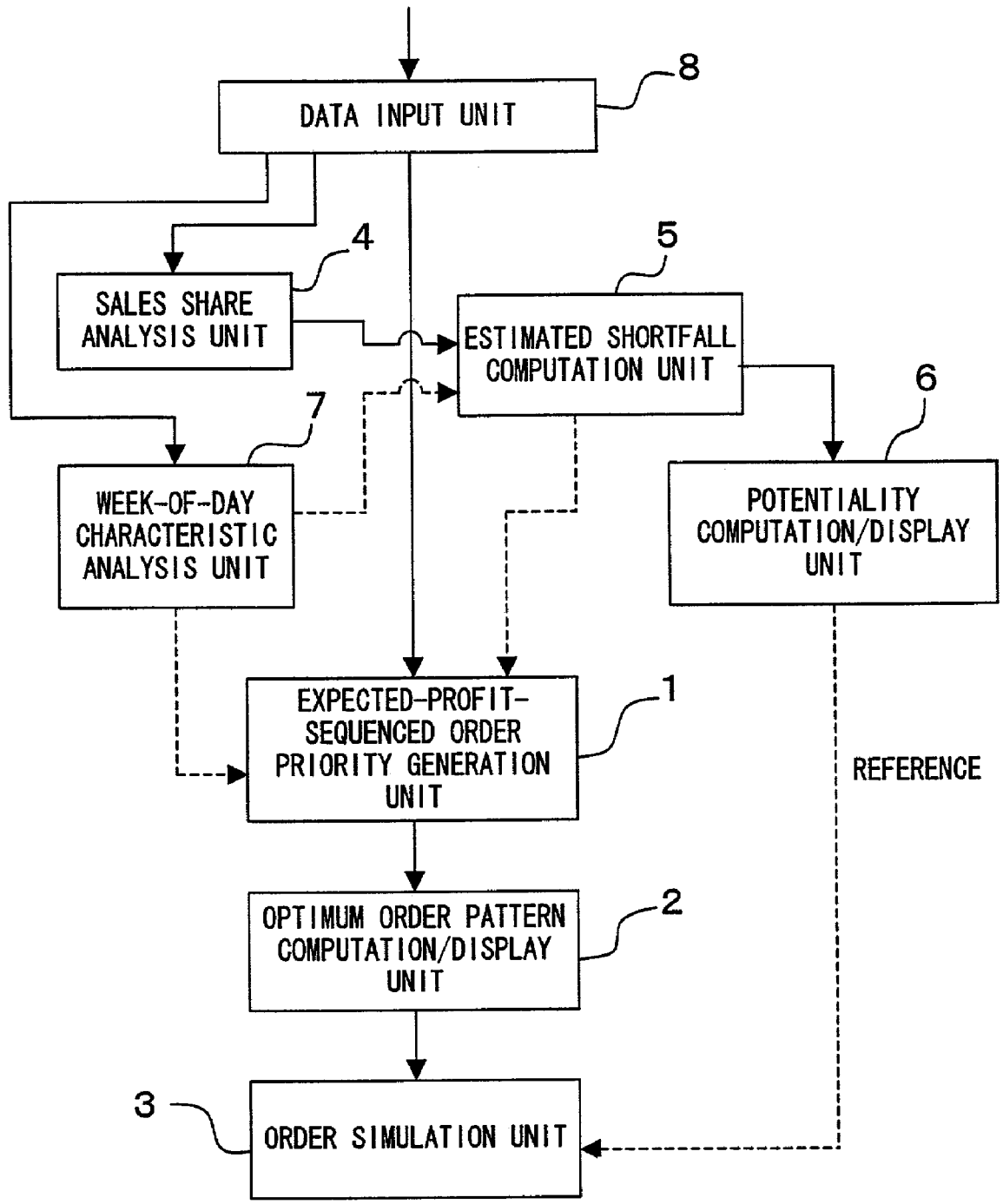
FIG. 1 is a block diagram of the functions according to the present invention.

FIG. 1 is a block diagram of the general function of the daily delivered articles order optimization support system.

In FIG. 1, the arrow in solid line indicates necessary but minimal data (or process result of the unit of the previous function) for the process of the function unit on the input side of the arrow. On the other hand, the arrow in dotted line indicates data not necessary and minimal in the process of the function unit on the input side of the arrow, but indicates that a more appropriate process result can be obtained if the data is input.

In FIG. 1, the necessary but minimal configuration according to the first feature of the present invention comprises an expected-profit-sequenced order priority generation unit 1 and an optimum order pattern computation/display unit 2.

The expected-profit-sequenced order priority generation unit 1 obtains an actual sales volume (sales result data) for each sale day in the sales time period of the delivery relating to the order being placed for each article based on the sales result data, etc. in the latest period of the past input through a data input unit 8. Based on the actual sales volume (based on the actual sales volume+estimated shortfall when the computation result from an estimated shortfall computation unit 5 is used), the cumulative probability density (the probability at which the n-th (n is any integer in the range of 1 to m described later) piece of the article is not sold) is obtained when it is assigned to the cumulative normal distribution function by assuming that it is normal distribution with $\mu$ indicating an average value, and $\sigma$ indicating a standard deviation (at this time, a more appropriate value can be obtained by taking an estimated carry-over, etc. (computed in the process for the previous delivery) from the previous delivery into account).

Based on the cumulative probability density, the data about cost/gross profit of each article obtained from the data input through the data input unit 8, the expected profit amount/expected profit rate is obtained for each of the first through m-th (m is the largest number, for example, 20) piece of each article.

expected profit amount=gross profit×(1−cumulative probability density)−cost×cumulative probability density expected profit rate={gross profit×(1−cumulative probability density)−cost×cumulative probability density}/sales price (where (1−cumulative probability density) indicates the probability at which the n-th piece of the article can be sold)

If the expected profit amount/expected profit rate is obtained for each of the first through n-th piece of each article, all articles are sorted in order from the highest expected profit rate (or expected profit amount) regardless of articles (thereby generating an expected-profit-sequenced order priority).

The optimum order pattern computation/display unit 2 computes and displays the optimum order pattern (that is, the volume to be ordered for each article) on a set condition (for example, according to an order budget) based on the process result of the expected-profit-sequenced order priority generation unit 1.

Thus, the first feature of the present invention resides in that the optimum profit-making (the largest possible profit can be expected) order pattern can be automatically computed. Based on another merit of computing a profit-making order pattern, articles different in price range and specification (for example, lunch boxes at 800 yen apiece and rice balls at 100 yen apiece) can be swapped on a profit-making basis.

Then, through an order simulation unit 3, the user can input the actual order volume by referring to the contents computed/displayed by the above mentioned optimum order pattern computation/display unit 2, simulate the computation of an order amount and a profit amount depending on the actual order volume, and then order the user decided volume.

Furthermore, the process according to the above mentioned first feature of the present invention can improve the analysis precision using the analysis result from a week-of-day characteristic analysis unit 7. That is, the week-of-day characteristic analysis unit 7 determines whether or not the sales pattern by time period depends on weekday or holiday (or any day of a week). Depending on the determination result, the process according to the first feature of the present invention improves the analysis precision by separately performing the process between weekdays and holidays. The same effect can be obtained in the process according to the second feature of the present invention described below. The necessary but minimal configuration according to the second feature of the present invention includes a sales share analysis unit 4, the estimated shortfall computation unit 5, and a potentiality computation/display unit 6.

The sales share analysis unit 4 obtains a sales share by time period based on the sales result data, etc. in the latest period of the past input through the data input unit 8 (in this example, the sum of sales amounts of all articles is obtained by time period, not by article, and the total amount of sales is accumulated. Then, the value obtained by dividing the above mentioned total amount of sales by the sum of sales amounts by time period can be the sales share by time period).

Since the week-of-day characteristic analysis unit 7 obtains the sales share by time period separately on holidays and weekdays (or any day of a week), it can be used when the analysis precision is to be improved by performing the process separately between weekdays and holidays according to the second feature of the present invention.

The estimated shortfall computation unit 5 computes the estimated shortfall by time period for each article based on the data such as the sales share by time period, the sales result data in the latest period of the past input through the data input unit 8, the delivery volume of each article in each delivery, the delivery time/discard time of each set delivery, etc.

The potentiality computation/display unit 6 computes the potentiality of each article using the estimated shortfall by time period for each article, etc., and displays it as a list.

potentiality=total demand value (=total sales volume+total shortfall)/total sales volume The larger the potentiality of an article is, the larger loss of sales opportunities the article has. The user can usefully refer to the value in appropriately determining the increase/decrease of the order volume and the top sellers/shelf warmers.

The potentiality can be referred to by the user in determining the actual order volume using the order simulation unit 3.

Figure 2:
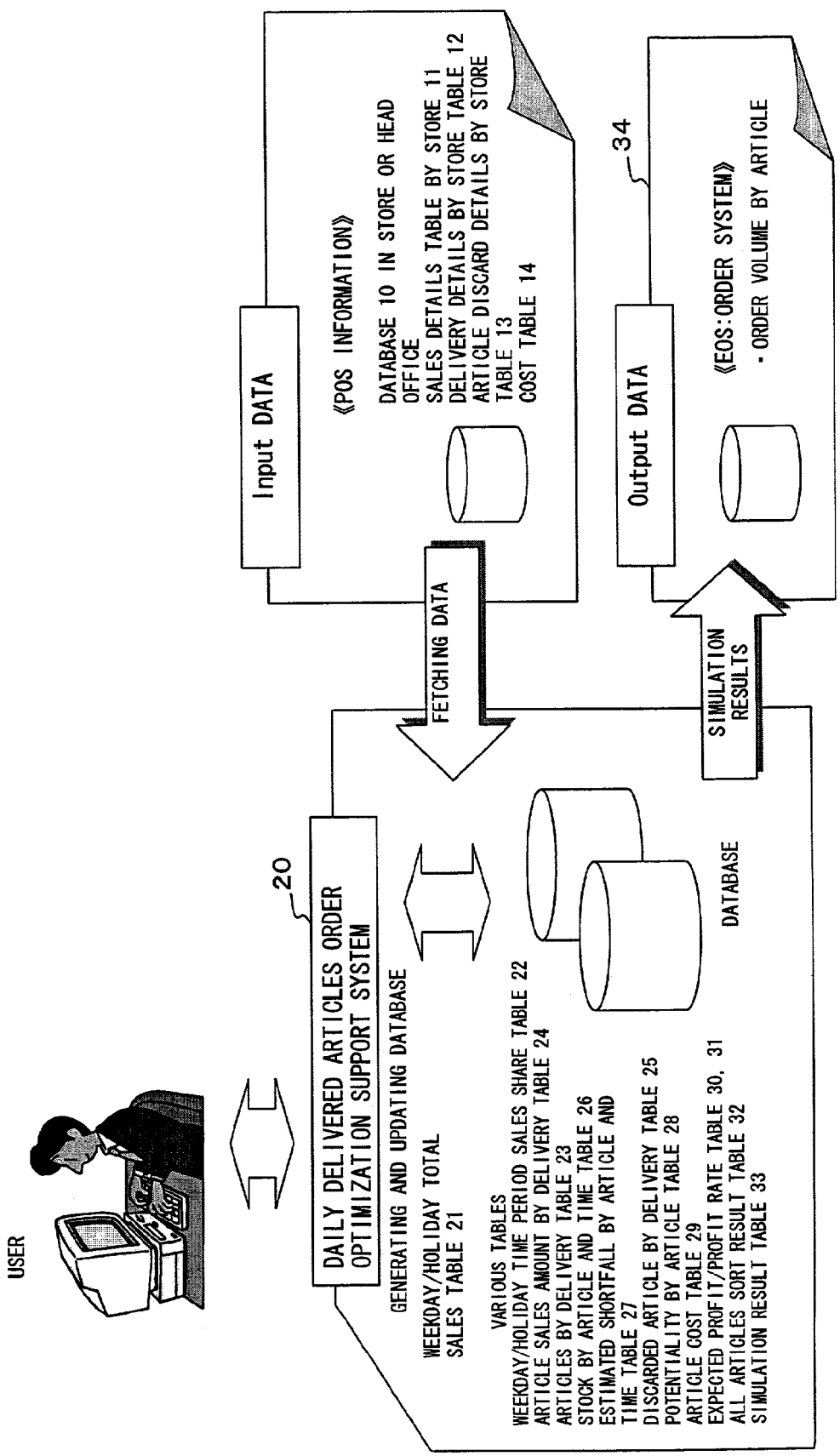
FIG. 2 shows the general configuration of the daily delivered articles order optimization support system.

FIG. 2 shows the general configuration of the daily delivered articles order optimization support system.

When an order is placed for the next delivery, a daily delivered articles order optimization support system 20, for example, fetches necessary data from a database 10 (POS information) of each store or the head office of a convenience store, etc., and performs various processes described later (various tables obtained during the processes are stored in the database of the optimization support system 20). Then, at the end of the processes, it transmits the order articles/order volumes for the next delivery to an order system 34 based on the simulation result depending on the input, etc. of the user, thereby terminating the ordering process.

The database 10 of the head office stores, for example, a sales details table 11, a delivery details table 12, an article discard details table 13, a cost table 14, etc. by store.

During or as a result of the processes performed by fetching the data of various tables stored in the database 10, a weekday/holiday total sales table 21, a weekday/holiday time period sales share table 22, an articles by delivery table 23, an article sales amount by delivery table 24, a discarded article by delivery table 25, a stock by article and time table 26, a shortfall by article and time table 27, a potentiality by article table 28, a article cost table 29, an expected profit amount by day and delivery table 30, an expected profit rate by day and delivery table 31, an all articles sort result table 32, and a simulation result table 33 are generated/stored in the database of the daily delivered articles order optimization support system 20.

These tables are described below by referring to respective examples.

FIG. 3A show a general flow of an ordering process.

The meanings of each operation shown in the figures are described below in detail.

The flowchart shown in FIG. 3A is described below.

First, the user sets holiday settings (step S1). For example, Sundays/festival days are naturally holidays. The user sets/inputs whether or not Saturdays are holidays, and whether or not there are any days to be processed as holidays in the special process described later. FIG. 3B shows an example of a holiday setting screen 41.

After completing the holiday settings, necessary data is fetched from the database 10 of each store or head office (step S2).

Next, the user is to set an analysis condition (step S3). FIG. 3C shows an example of an analysis condition setting screen. There is a setting/input area for a data period 43, an order limit amount 44, and a delivery time setting 45 on an analysis condition setting screen 42 shown in FIG. 3C.

The latest period described later is input into the data period 43. An order budget (total purchase amount) described later is input into the order limit amount 44. The delivery time/discard time of each delivery described later is input into the delivery time setting 45.

The daily delivered articles order optimization support system 20 performs the optimum computation process as described later in detail by referring to FIG. 4 and subsequent figures (step S4).

Then, the user refers to the article order simulation screen displayed as a result of the process in step S4, and inputs/determines the actual order volume (step S5).

The inputted data is passed to the order system 34, thereby terminating the ordering process (step S6).

Figure 4:
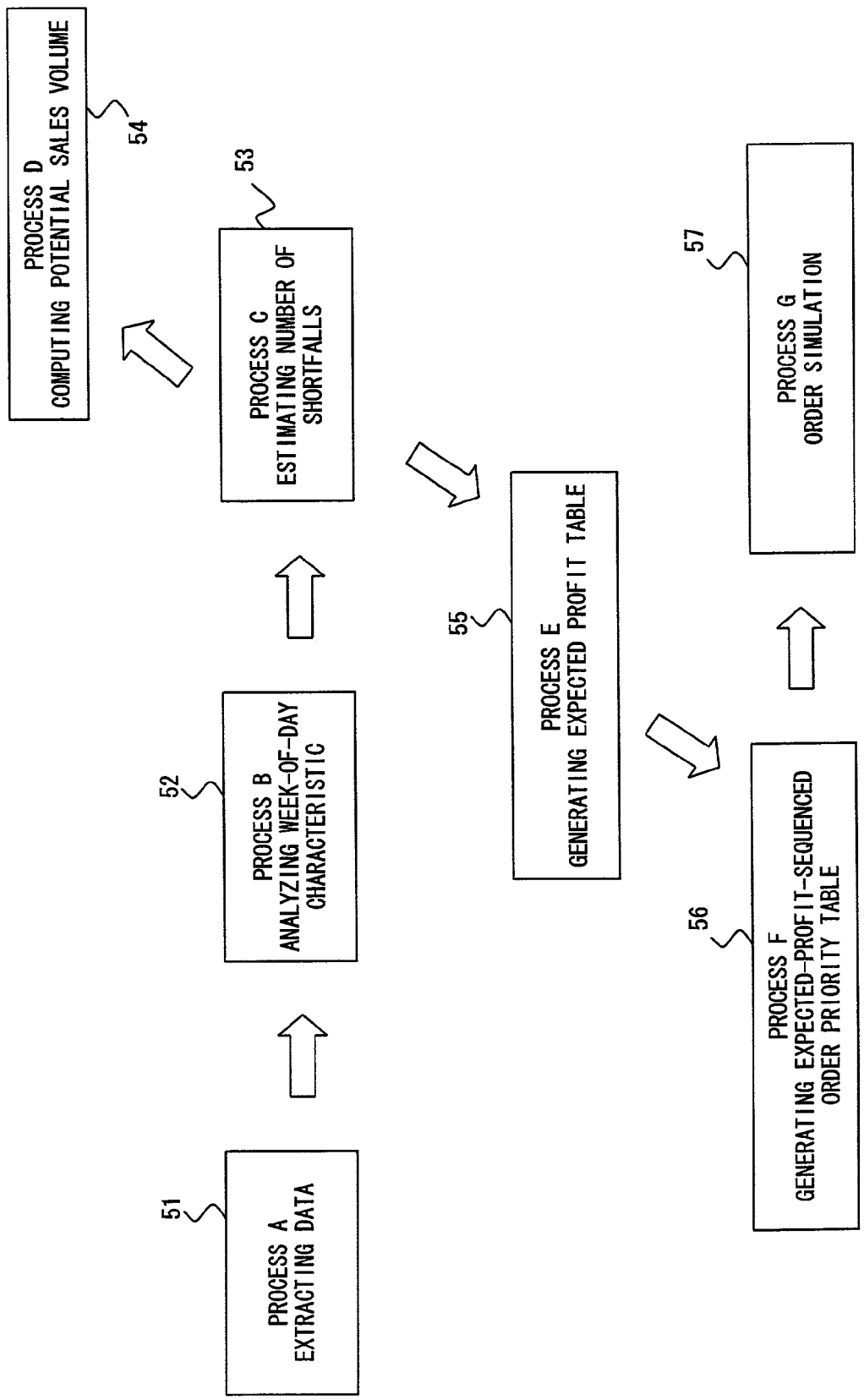
FIG. 4 shows the general analysis process for support of the daily delivered articles order optimization.

FIG. 4 generally shows the analysis process for the daily delivered articles order optimization support according to an embodiment of the present invention.

In FIG. 4, a process A 51 displays, for example, an list of each convenience store, and has a user select a desired store. The processes in and after a process B 52 are performed on the selected store.

In the process B 52, the data stored in the sales details table of the store selected in the process A 51 is read, and it is determined whether or not the sales pattern by time period depends on weekday/holiday. If the data depends on weekday/holiday, then the subsequent processes are separately performed between a weekday and a holiday.

In a process C 53, a estimated shortfall is computed by article and time.

The processes in and after the process C 53 are those in a process D 54, or in processes E 55 through G 57.

In the process D 54, the potentiality by article (article potential sales) is obtained using the estimated shortfall data by article and time obtained in the process C 53. The potentiality by article refers to the possible sales of each article. Thus, an article of a larger loss of sales opportunities can be promoted (for an increased order volume for more sales, etc.), and an appropriate management can be performed on top sellers and shelf warmers.

The processes E 55 through G 57 are described below. First, in the process E 55, the expected profit table generating process is performed using the estimated shortfall data by article and time obtained in the process C 53. Then, in the process F 56, an expected-profit-sequenced order priority table is generated by sorting the articles in order from the highest expected profit based on the expected profit table. Then based on the process results, an order simulation is performed in the process G 57.

Each of the above mentioned processes is described below in detail.

Figure 5:
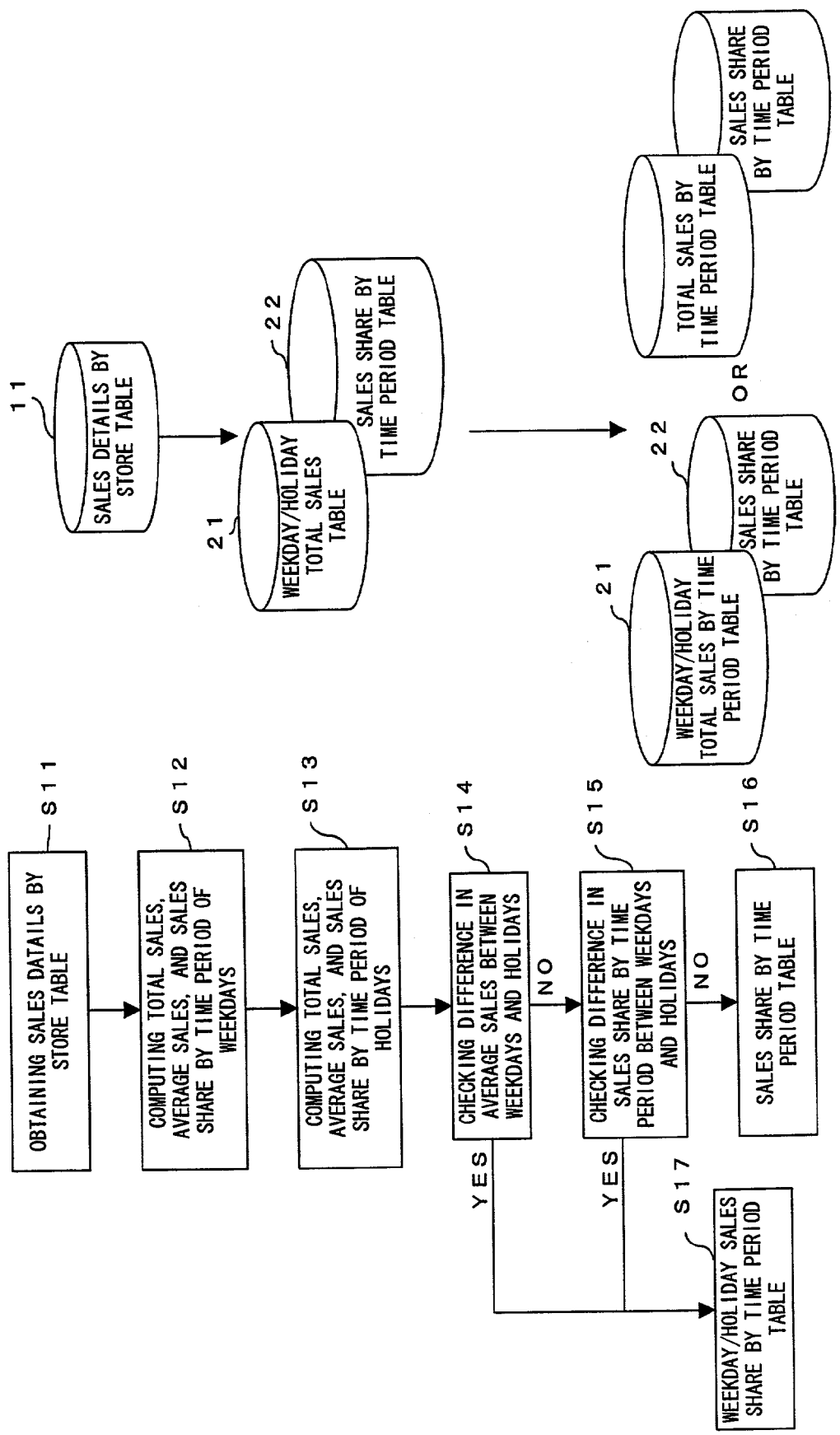
FIG. 5 is a detailed flowchart of the process B.

FIG. 5 is a flowchart of the detailed process in the process B 52.

FIGS. 6A through 6C show examples of the contents of the table relating to the corresponding processes on the above mentioned tables. The weekday/holiday flag shown in FIGS. 6B and 6C indicates a weekday when it is set to 0, and a holiday when it is set to 1. Since FIGS. 6A through 6C show only practical examples for reference, the contents are not specifically explained in detail here.

In FIG. 5, the sales details table 11 (FIG. 6A) of the store selected in the process A 51 is obtained (step S11). All data in the latest period (the data period set/input on the above mentioned analysis data condition setting screen) is obtained.

Then, the all article sales amounts, the average sales, and the sales share by time period are computed for each weekday (step S12).

That is, according to the obtained sales details table 11, the total amount of all articles sales is computed for each weekday in the latest period (as shown in FIG. 6B). Then, the total amount of all articles sales of all weekdays in the latest period is computed (that is, the sales amounts of all articles having the record whose weekday/holiday flag indicates 0 in FIG. 6B are added up. This forms the weekday/holiday total sales table 21).

The total value is divided by the total number of days of the weekdays, thereby obtaining an average value (average sales).

On the other hand, the sales shares by time period are grouped into weekday data and holiday data according to the obtained sales details table 11, and the respective total article sales amounts are obtained by time period (thus, the weekday/holiday time period total sales table shown on the left of FIG. 6C can be generated).

The sales share by time period can be obtained by dividing the time period total sales amount by the 24-hour total amount (the weekday/holiday time period sales share table 22 shown on the right of FIG. 6C is generated).

The all articles sales amount for each day, the average sales amount on holidays, and the sales share by time period can similarly be obtained for holidays (step S13).

Then, based on the average sales amounts on weekdays and holidays obtained in steps S12 and S13, it is confirmed using the t check (checking the difference between average values) whether or not the all articles total daily sales amount depends on weekdays or holidays (step S14).

Since the t check is well known, the detailed explanation is omitted here. For example, if the hypothesis that 'average sales amounts are almost equal between weekdays and holidays' is rejected at the significant level of 5%, then the result that the level of the total daily sales amount is different between weekdays and holidays can be obtained (YES in step S14), thereby passing control to the process in step S17.

For example, if the above mentioned hypothesis is not rejected at the significant level or 5% (NO in step S14), then it is checked whether or not there is a difference in the sales patterns in the respective time periods between weekdays and holidays using the weekday/holiday time period sales share obtained in steps S12 and S13 (step S15).

The check is made by the $\chi^2$ check (independence check). Since the $\chi^2$ check is also well known, the detailed explanation is omitted here. However, if the hypothesis that 'sales shares by time period are almost equal between weekdays and holidays' is rejected at the significant level of 5%, then the result that the sales patterns by time period are different between weekdays and holidays can be obtained (YES in step S15), thereby passing control to the process in step S17. Otherwise (NO in step S15), control is passed to step S16.

In the process in step S16, it is not necessary to analyze data between weekdays and holidays in the checks in steps S14 and S15. Therefore, a sales share by time period table is generated commonly for weekdays and holidays.

On the other hand, in the process in step S17, it is necessary to analyze data in the check in steps S14 and S15 separately between weekdays and holidays. Therefore, the weekday/holiday time period sales share table 22 is used.

FIG. 7 is a flowchart of the detailed process C53.

In FIG. 7, when sales patterns by time period are not different between weekdays and holidays as a process result in the process B 52 (NO in step S21), the sales share by time period table generated in step S16 is obtained (step S22).

On the other hand, if sales patterns by time period are different between weekdays and holidays as a process result in the process B 52 (YES in step S21), then the day of a week of the order date is obtained (step S23), the sales share by time period table for weekdays is obtained when the order day is a weekday, and the sales share by time period table for holidays is obtained when the order day is a holiday (step S24).

After the process in step S22 or S24, necessary data (of the day corresponding to the process in the latest period (for example, all holidays in the latest period when the determination is YES in step S21 and 'holiday' in step S24)) is fetched from the delivery details table 12 and the sales details table 11 of the store to be analyzed, and the articles by delivery table 23 and the article sales amount by delivery table 24 are generated (step S25).

FIG. 8A shows an example of the data configuration of the articles by delivery table 23, and FIG. 8B shows an example of the data configuration of the article sales amount by delivery table 24.

As shown in FIGS. 8A, 8B, the articles by delivery table 23 stores the data indicating the volume of a delivered article and the delivery number for each day. The article sales amount by delivery table 24 stores the data indicating the volume of a delivered article sold in each time period for each day, and the delivery number.

Using the data of the articles by delivery table 23 and the article sales amount by delivery table 24, the processes in steps S26 and S27 are performed on each article. That is, the stock by article and time table 26 and the shortfall by article and time table 27 described later are generated for each article.

First described below is the process in step S26. Before performing the present process, an article to be processed is selected, the data about the article is extracted from the articles by delivery table 23 and the article sales amount by delivery table 24, the stock in each time period is computed for each delivery, and the stock in each time period is computed for a total of all deliveries (as described above, although the original data is managed by delivery, the stock computed in this process and the shortfall described later are not separately obtained for each delivery).

FIG. 9 shows the process of computing the stock in each time period.

Figure 3:
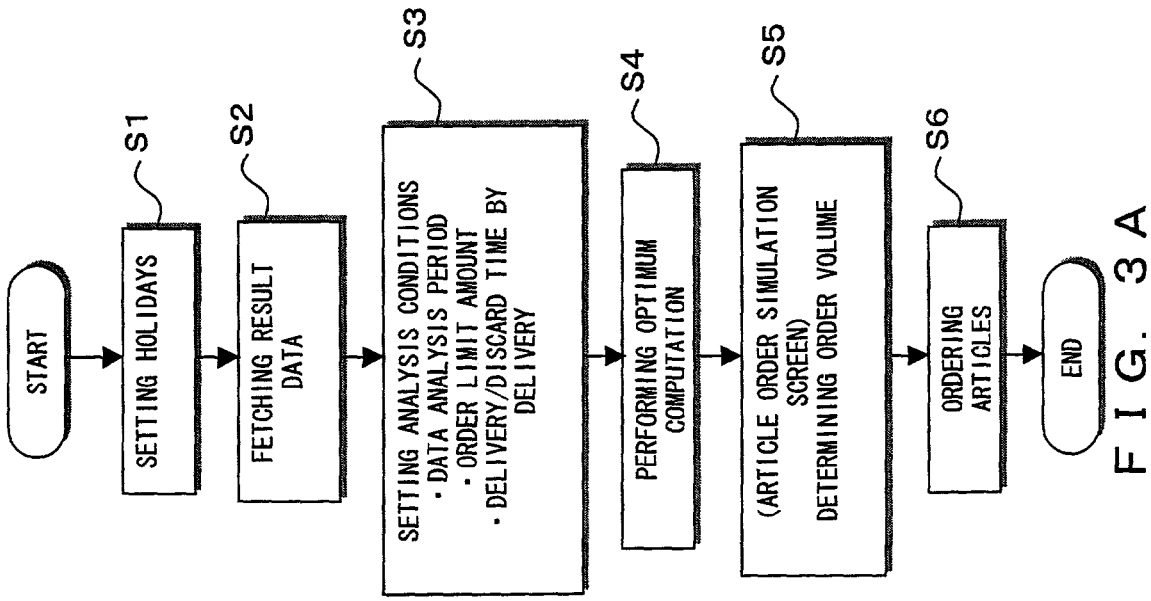
FIG. 3A is a general flowchart of the optimizing/ordering process in the daily delivered articles order optimization support system.
FIG. 3B shows an example of a holiday setting screen.
FIG. 3C shows an example of an analysis condition setting screen.

In FIG. 9, as set in FIG. 3, the delivery time and the discard time in each delivery are determined. In this example, the delivery times of the first, second, and third deliveries are respectively 1:00, 10:00, and 17:00, and the discard times of the first, second, and third deliveries are respectively 16:00, 0:00, and 10:00.

In FIG. 9, delivery 61, 65, and 69 store the delivery volumes of an article to be processed at the delivery time of each delivery according to the articles by delivery table 23. Sales 62, 66, and 70 store the sales volume in each time period of each delivery of the article to be processed according to the data extracted from the article sales amount by delivery table 24.

First, the stock volume in each time period of each delivery is obtained. It is computed by, for example, the following equation (1) for each time period.

$$\text{current stock volume} = \text{previous stock} - \text{current sales volume} + \text{current delivery volume} \quad (1)$$

However, the stock volume at the discard time of each delivery is forcibly set to 0. In this example, the stock volumes of the first delivery at 16:00, the second delivery at 0:00, and the third delivery at 10:00 are forcibly set to 0. Until the next delivery time after the discard time, the stock volume of the delivery is obviously 0.

In the present embodiment, the initial stock volume is set as follows.

first delivery . . . 0
second delivery . . . sales volume at 0:00
third delivery . . . total sales volume from 0:00 to 10:00

When the sales volume and the stock volume in each time period are obtained for each delivery in the above mentioned process, the total volume for each time period is obtained. That is, the sales 62, 66, and 70 are added up for each time period, and the result is stored in sales 73. Stock 64, 68, and 72 are added up for each time period, and the result is stored in stock 74.

Thus, the table storing the sales volume and the stock volume for each time period regardless of the delivery is the stock by article and time table 26. If the stock by article and time tables 26 are generated for all articles by performing the above mentioned processes on all articles, then the process of computing the estimated shortfall by time period is performed using these stock by article and time tables 26 and the weekday/holiday time period sales share table 22 (or the sales share by time period table) (step S27).

FIG. 10 shows the general method of computing the estimated shortfall by time by referring to an example.

In the table shown in FIG. 10, a share 75 is the data obtained from the weekday/holiday time period sales share table 22 (or a sales share by time period table). Therefore, it is a share by time period, not by article (thereby not changing a value for each article to be processed). On the other hand, the stock 74 and the sales 73 are data of the articles to be processed and obtained from the stock by article and time table 26. They indicate the values by article and time period.

In the actual computation, no volume data such as the stock 74 is used, but a flag indicating the presence or absence of a stock of articles as described later. If a flag indicates the presence (=1) of a stock of articles for each time period, then the estimated shortfall is zero (0) as described above. If a flag indicates the absence (=0), the estimated shortfall is computed.

In the example shown in FIG. 10, the data is displayed in the range of 10:00 to 14:00 for simple explanation. In this range, if the estimated shortfall is computed for each time period, the estimated shortfall indicates the sales volume if the stock is recorded after it has run out. Therefore, the estimated shortfall at 10:00 and 11:00 when there is a stock of articles is 0.

At 13:00 and 14:00 when there is no stock of articles, the estimated shortfall is computed in the computation method as shown in FIG. 10.

That is, in the range of 10:00 to 14:00, the sales volumes are summed up except for the time period to be processed, the shares in the time periods in which there is a stock of articles are added up, the total sales volume is divided by the total share values, and the result is multiplied by the share of the time period to be processed, thereby obtaining the estimated shortfall in the time period. For example, if the data at 13:00 is to be obtained, the total sales volume is 2 at 11:00 added to 3 at 12:00, that is, a total of 5. The share at 10:00 where there is a stock of articles is 0.1, and the share at 11:00 is 0.1. Therefore, the total share is 0.2. Since the share at 13:00 is 0.07, the estimated shortfall at 13:00 is computed as follows.

$$(5/0.2) \times 0.07 = 1.75$$

Although the example shown in FIG. 10 is an example of computation in the range of 10:00 to 14:00, the actual computation is performed on all time periods except each time period from 0:00 to 23:00 (for example, when data at 13:00 is obtained, the total sales volume from 0:00 to 12:00 and from 14:00 to 23:00 is divided by the total value of shares in the time periods in which there is a stock of articles, and the result is multiplied by the share (0.07) at 13:00, thereby obtaining the estimated shortfall at 13:00).

When the stock volume and the sales volume in each time period in 24 hours (1 day) are all 0, it can be considered that no order has been intentionally placed, thereby setting the estimated shortfall in all time periods equally to 0.

Furthermore, the computation of the estimated shortfall in the case in which there is no stock of articles, for example, at 12:00, but a sales volume is recorded is described below by referring to FIG. 11.

FIG. 11 shows an example of the shortfall by article and time table 27, and an example of the method of computing the estimated shortfall.

An order volume (=delivery) 84 and a discard volume 86 are shown because the data of the shortfall by article and time table 27 is used when the potentiality by article table 28 as shown in FIG. 13 is generated in the process D 54 described later. However, since they are not required in the estimated shortfall computation process, the detail description is omitted here.

(a) A stock flag 81 is set to 0 when there is no stock of articles, and is set to 1 when there is a stock of articles.

(b) A time period share 82 is, for example, the share 75 shown in FIG. 10.

(c) 83 is obtained by multiplying stock flag 81 by time period share 82 for each time period so that the denominator (that is, the sum of the shares in the time periods where there is a stock of articles) in the estimated shortfall equation shown in FIG. 10.

(d) A sales volume 85 refers to the sales 73 shown in FIG. 10.

Using these (a)stock flag 81, (c) 83, and (d) sales volume 85, (e)the estimated shortfall (Kn) 87 (Kn: n indicates each of the time periods 0 through 23) in each time period is computed.

$$\text{estimated shortfall } (Kn) = -1 \times (Fn-1) \times Sn \times \Sigma \text{ sales volume } 85/\Sigma(\text{stock flag } 81 \times \text{time period share } 82) - Hn \quad (2)$$

(when Kn≦0, Kn is set to 0 (Kn=0), and when the total sales volume in 24 hours is 0, the shortfall in the day is 0.)

The range of Σ in the equation (2) is all time periods excluding the time (n) being computed in the range of 0:00 to 23:00 as described above. On the other hand, Fn, Sn, and Hn correspond to (a) stock flag 81, (b) time period share 82, and (d) sales volume 85 of the time (n) to be computed this time. In the equation (2), the shortfall in the time period (Fn=1) where there is a stock of articles is necessarily 0 by '−1×(Fn−1)' (because Kn=0 when Kn≦0 although a negative value is obtained by −Hn). On the other hand, normally (except the case at 10:00 shown in FIG. 10) in a time period where there is no stock of articles, −Hn is necessarily 0 (no stock of articles cannot sell).

The '−Hn' at the end of the equation (2) is used to make an amendment to the time period which indicates the sales volume although there is no stock of articles as in the case at 12:00 shown in FIG. 10. Therefore, when such time periods are not taken into account, '−Hn' is not required.

That is, the example of a time period at 12:00 shown in FIG. 10 indicates the stock volume of 3 initially (at 12:00) in the time period, and 3 pieces are sold in the time period from 12:00 to 12:59. However, since the stock volume according to the present embodiment indicates the stock volume at the end of each time period (12:59 in this example), the system indicates the data of the stock volume of '0'. According to the present embodiment, in the above mentioned case, an amendment is made such that the estimated shortfall can be 0 when the computed estimate shortfall (computation result of the portion other than '−Hn' in the equation (2)) is equal to or smaller than the sales volume by the '−Hn' in the equation (2) (that is, if there is a certain sales amount in a time period, it is assumed that no shortfall is detected in the time period).

Thus, when the estimated shortfall by time period is computed for each article, control is passed to the potentiality computing process in the process D 54 or the expected profit table generating process in the process E 55.

First, the potentiality computing process in the process D 54 is described below by referring to FIGS. 12 and 13.

Figure 12:
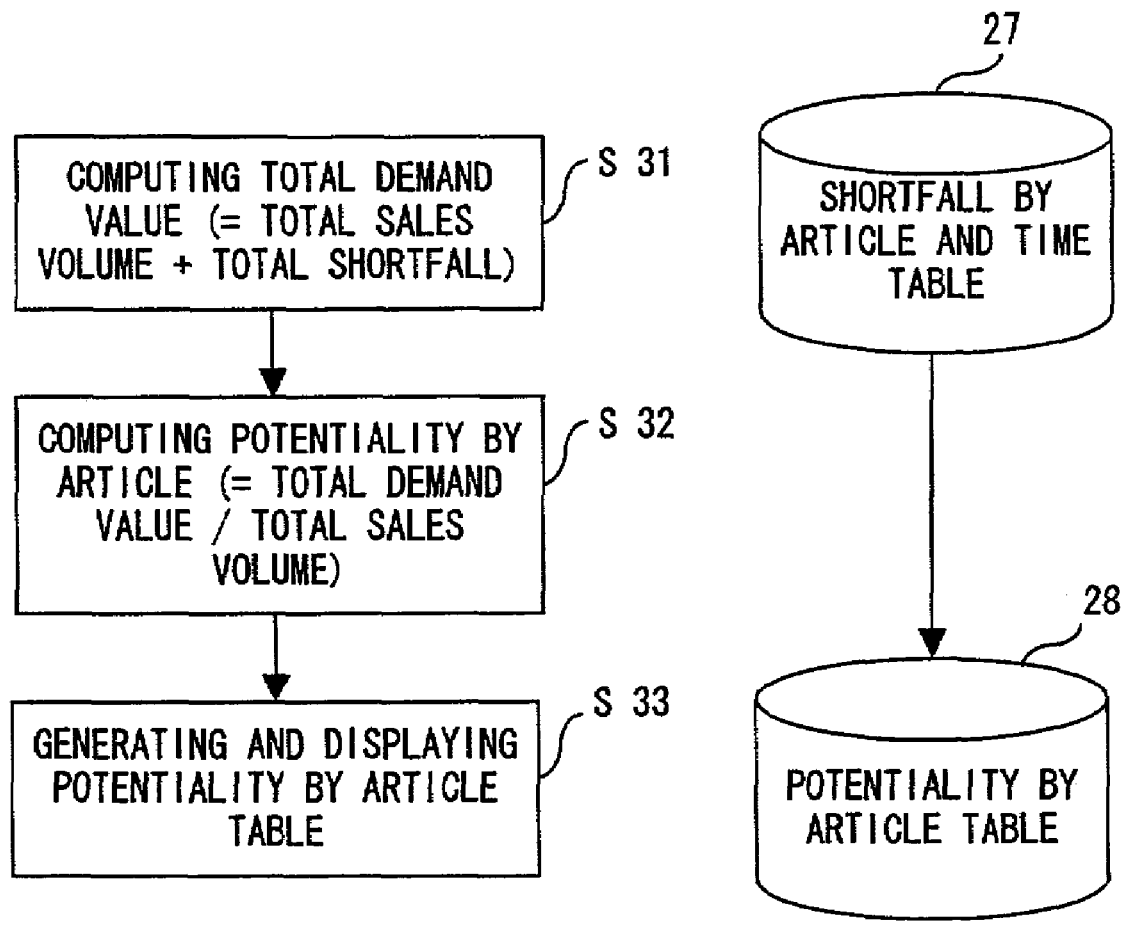
FIG. 12 is a flowchart of the potentiality computing process in the process D.

FIG. 12 is a flowchart for explanation of the potentiality computing process in the process D 54.

In the process C 53, the shortfall by time period is computed for each article, and the sales volume in each time period is obtained. Therefore, the sum of these volumes (from 0:00 to 23:00) is obtained for each article (total sales volume and total shortfall).

Then, the total demand value is computed by the following equation (3) (step S31).

$$\text{total demand value} = \text{total sales volume} + \text{total shortfall} \qquad (3)$$

Then, the potentiality by article is computed by article by the following equation (4) (step S32).

$$\text{potentiality by article} = \text{total demand value}/\text{total sales volume} \qquad (4)$$

Then, a potentiality by article table is generated and displayed based on the computation result (step S33).

FIG. 13 shows an example of the potentiality by article table 28.

The potentiality by article table 28 in the example shown in FIG. 13 contains items of a sales days 91, a total order volume 92, a total actual sales volume 93, a sales volume per day 94, a total discard volume 95, a total shortfalls 96, a total demand volume 97, a total demand volume per day 98, and potentiality 99.

The sales days 91 indicates the number of actual sales days in the latest period for each article. Although not clearly specified, it is indicated in the process in steps S25 and S26.

The total order volume 92 can be obtained from order volume 84 of the shortfall by article and time table 27 (obtaining a sum). Similarly, the total actual sales volume 93, the total discard volume 95, and the total shortfalls 96 can be obtained from the data of the shortfall by article and time table 27.

The sales volume per day 94 is obtained by 'total actual sales volume 93/sales days 91'.

The total demand volume 97 is a value obtained in step S31, and the total demand volume per day 98 is obtained by dividing the total demand volume 97 by the sales days 91. The potentiality 99 is obtained in the above mentioned step S32.

Thus, in the example shown in FIG. 13, various data including the potentiality 99 are stored. If the potentiality 99 is displayed, the user determines whether or not the order volume is to be increased/decreased, etc. That is, since the 'potentiality' is computed by the following equation, the larger value can be considered to refer to an article having a larger loss of sales opportunities.

$$\text{potentiality} = \text{total demand value (of actual sales days)}/\text{total sales volume (of actual sales days)}$$

Therefore, for example, when a user requests to increase the order volume of rice balls by 2 pieces, the user refers to the potentiality 99, and can increase the order volume of the article having a larger value of the potentiality 99 in various rice balls.

Thus, by computing/displaying the potentiality, the user can appropriately determine the increase/decrease of the order volume. In addition, the user can also appropriately manage top sellers/shelf warmers.

The process E 55 is described below by referring to FIGS. 14 through 17.

Figure 14:
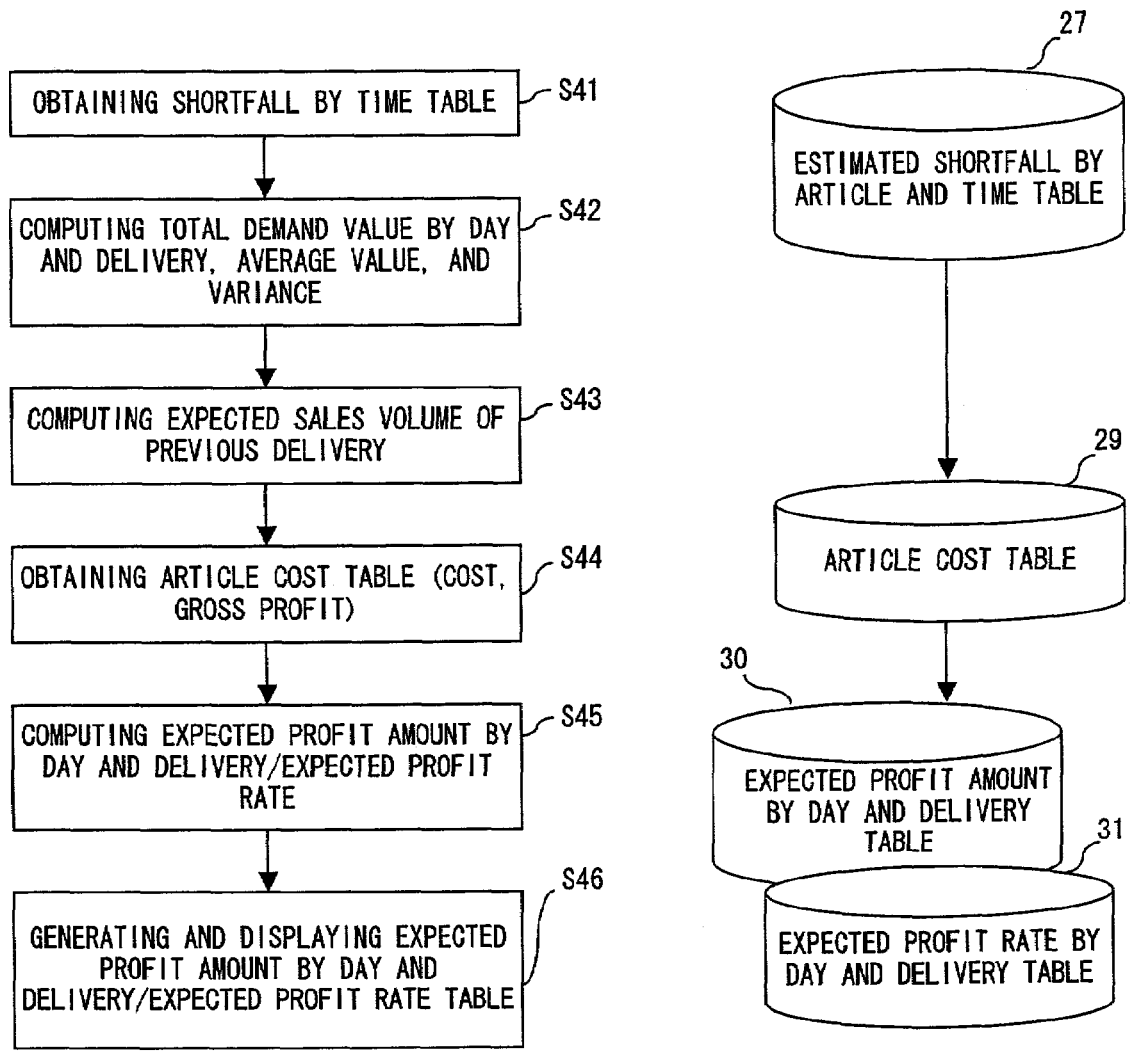
FIG. 14 is a flowchart of the process E.

FIG. 14 is a flowchart of the process E 55.

Figure 15:
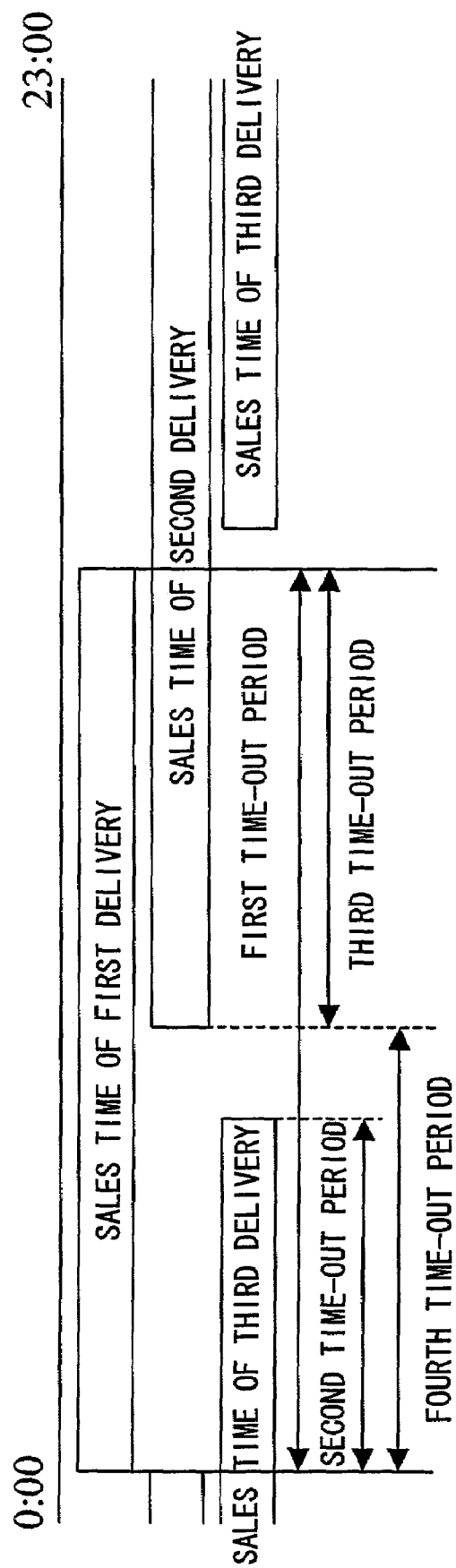
FIG. 15 shows an example of the process shown in FIG. 14.
Figure 18:
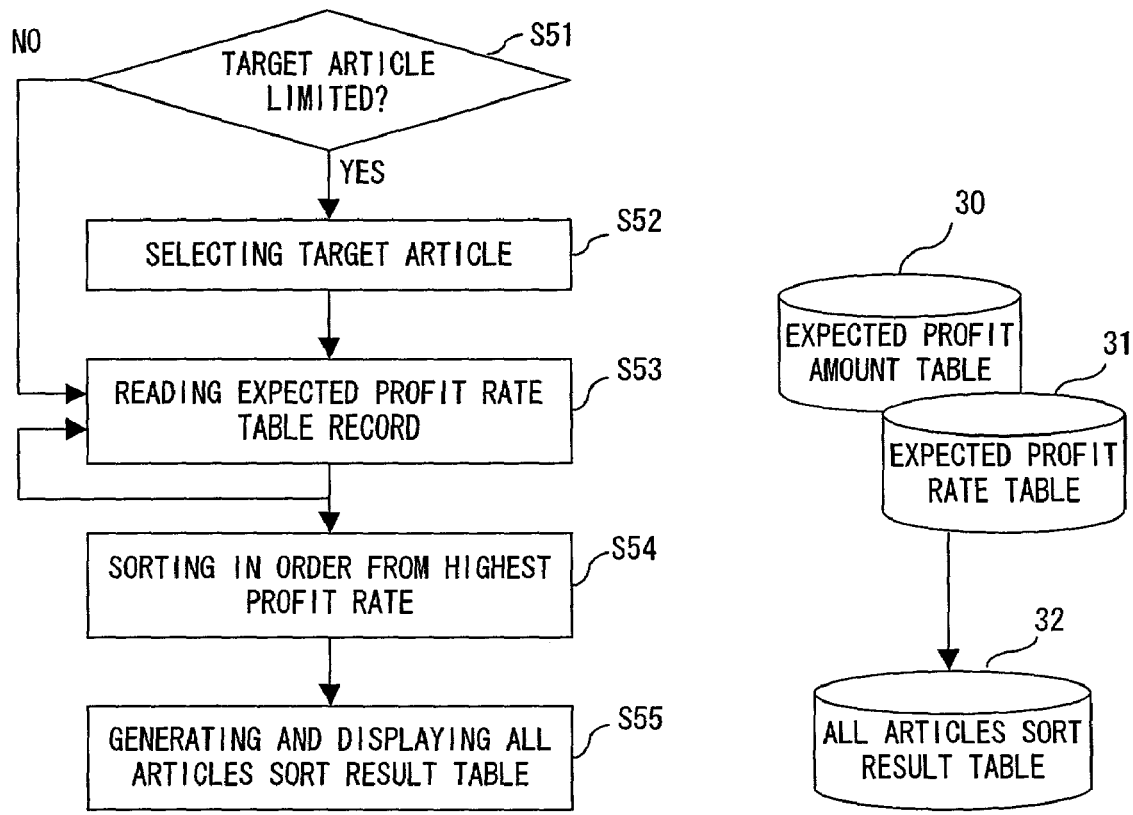
FIG. 18 is a flowchart of the process F.

The process shown in FIG. 14 is described below by assuming that the expected profit rate of one delivery in a day shown in FIG. 15 is obtained before placing an order for the delivery. That is, in the process C 53, an analysis is carried out by time period regardless of delivery. However, in the process E55 and subsequent processes, a process is performed on an arbitrary delivery before placing an order for the delivery.

In FIG. 15, the sales time for the first delivery is defined as the first time-out period, the time period in which the sales time of the first delivery overlaps the sales time of the third delivery is defined as the second time-out period, the time period in which the sales time of the first delivery overlaps the sales time of the second delivery is defined as the third time-out period, and the time period from the start of the sales time of the first delivery to the start of the sales time of the second delivery is defined as the fourth time-out period.

First in FIG. 14, the estimated shortfall by article and time table 27 generated in the process C53 is obtained (step S41).

Next, the total demand volume by day and delivery (sales volume+estimated shortfall) of the first time-out period of each day is computed by article based on the sales result data in the latest period. Based on the computed results, the average value μ and the variance (standard deviation) σ are obtained (step S42).

For example, if the target day of the current process is a weekday and the target article is a 'lunch box', and if the total sales volume of the 'lunch box' in the first time-out period (1:00 to 16:00) on weekdays (Monday, Tuesday, Wednesday, Thursday, and Friday) in the latest period is (4, 5, 3, 5, 3), and the total volume of the estimated shortfall is (2, 3, 2, 4, 3), then the total demand volume of one delivery in each day (sales volume+estimated shortfall) is (6, 8, 5, 9, 6). In this example, the result is the normal distribution of an average value μ, and a variance (standard deviation) σ (in this example, the average value μ=6.8 pieces, the variance (standard deviation) σ=1.64 pieces).

Then, the expected sales volume J by article in the previous delivery (third delivery in this example) sold in the second time-out period is computed by the following equation (5) (step S43).

$$\text{expected sales volume J} = \text{expected carry-over volume} - \text{expected discard volume} \qquad (5)$$

where the values for the expected carry-over volume/expected discard volume by article are obtained and stored by the following equations (6) and (7) after the order volume (n in the following equation) of each article is determined in the process on the previous delivery (third delivery) to have been performed before the process on the first delivery.

$$\text{carry-over volume} = \sum_{i}^{n} \Phi(\mu', \sigma', n) \qquad (6)$$

(where (μ', σ') is a total demand volume by article in fourth time-out period)

$$\text{discard volume} = \sum_{i}^{n} \Phi(\mu, \sigma, n) \qquad (7)$$

(where (μ, σ) is a total demand volume by article in first time-out period)

Next, the cost, the sales price, and the gross profit (=sales price−cost) data per piece of each article are obtained from the article cost table 29 (step S44). The article cost table 29 is generated in advance according to the cost table 14 (FIG. 16 shows an example of the article cost table 29).

Then, using each of the values (gross profit amount, cost amount, $\mu$, $\sigma$, J) obtained in the above mentioned steps S42, S43, and S44, the expected profit/expected profit rate by day and delivery is computed (step S45).

The expected profit is computed by sequentially obtaining for each article the expected profit when the first piece is ordered, the expected profit when the second piece is ordered, . . . , the expected profit when the n-th piece is ordered, . . . , the expected profit when the maximum pieces (for example, 20 pieces, etc. are set in advance) are ordered, and the n-th expected profit amount (Mn) is computed by the following equation (8).

$$Mn = \text{gross profit amount} \times (1 - \Phi(\mu, \sigma, n+J)) - \text{cost amount} \times \Phi(\mu, \sigma, n+J) \quad (8)$$

(where $\Phi(\mu, \sigma, n+J)$ is the cumulative probability density in the value n+J with the cumulative normal distribution function average $\mu$ and the variance $\sigma$.; it is obtained by NORMDIST (n+J, $\mu$, $\sigma$, TRUE) when it is computed using EXCEL).

That is, in short, $\Phi(\mu, \sigma, n+J)$ indicates the probability that the n-th piece of the article cannot be sold. Since the probability of unsalability and the probability of salability make 1 (100%), (1−$\Phi(\mu, \sigma, n+J)$) indicates the probability that the n-th piece of the article can be sold. Therefore, the above mentioned equation (8) is briefly expressed as follows.

$$Mn = \text{gross profit} \times \text{probability of salability of n-th piece} - \text{cost amount} \times \text{probability of unsalability of n-th piece}$$

where 'n+j' instead of 'n' in the equation (8) basically reduces the expected profit amount with an increasing volume of carry-over from a previous delivery (it is obvious that when the second piece is not sold, the third piece is not sold. Therefore, the expected profit amount tends to be smaller when the number of pieces is larger).

Furthermore, the normal distribution does not correspond to the sales volume, but corresponds to the 'sales amount+ estimated shortfall'. As a result, the value of the probability of the salability of the n-th piece is influenced by the estimated shortfall. Therefore, it influences the expected profit amount.

In addition, each time each expected profit amount is computed, the expected profit rate is obtained by the following equation (9).

$$\text{expected profit rate} = \text{expected profit amount}/\text{sales price} \quad (9)$$

In the above mentioned equation (9), for example, although an article A of the expected profit amount of 100 yen seems to be profitable over an article B of the expected profit amount of 50 yen only from the expected profit amount, the article B excels in the expected profit rate if the sales price of the article A is 500 yen and the sales price of the article B is 100 yen. Generally, since an article at a higher sales price is higher in gross profit per piece, there is the possibility that the order volume of the article at a higher sales price is larger only from the expected profit amount. Thus, the expected profit rate is obtained.

The above mentioned process is performed on all articles to be ordered, and the results are summarized and an expected profit amount/expected profit rate by day and delivery table is generated and displayed (step S46).

FIG. 17 shows an example of the expected profit amount/ expected profit rate by day and delivery table.

In the example shown in FIG. 17, an example of the expected profit rate by day and delivery table 31 is shown including a delivery name 101 (first delivery in this example) of a target expected profit amount/expected profit rate computing process, an article name 102, a sales price 103, a cost 104, a gross profit 105, etc. The items 1 through 5 (items 6 through 20 can be assigned when the maximum number is set to 20, but they are omitted in this example) shown on the right of the gross profit 105 indicate the 'expected profit rate when the n-th piece is ordered' computed in the above mentioned step S45.

Then, in the process F56 shown in 18, the user first determines whether a target process is set as all articles, or the target article is to be limited (in other words, for example, the articles, etc. not to be ordered are removed), and selects and specifies the determination (step S51).

When the selection/specification of the user limits the target article (YES in step S51), then the list of all article names are displayed, etc. to allow the user to specify (or exclude) the target article and select the target article (step S52). Otherwise, any article which has ever been delivered can be selected as a target article from the sales result data of the part.

The records of the expected profit rate table 31 are sequentially read (step S53 and its loop), and sorted in order from the highest expected profit rate (step S54). At this time, if the above mentioned process in step S52 is being performed, it is considered that only the records of the target article are read, but the records of an article other than the target article are not read.

Furthermore, the cumulative order amount of articles are sequentially computed in order from the highest sorted expected profit rate. The order amount can be either a sales price or a cost. In the example shown in FIG. 19, the cumulative order amount is computed by the sales price.

Thus, the all articles sort result table (order priority table) 32 as shown in FIG. 19 is generated/displayed (step S55).

The all articles sort result table (order priority table) 32 shown in FIG. 19 comprises the items of a delivery name 111 to be processed (first delivery in the example), an article name 112, a sales price 113, a cost 114, a gross profit 115, an n-th ordered piece 116, an expected profit rate 117, and a cumulative order amount 118.

Then, the order simulation of the process G 57 is performed.

Figure 20:
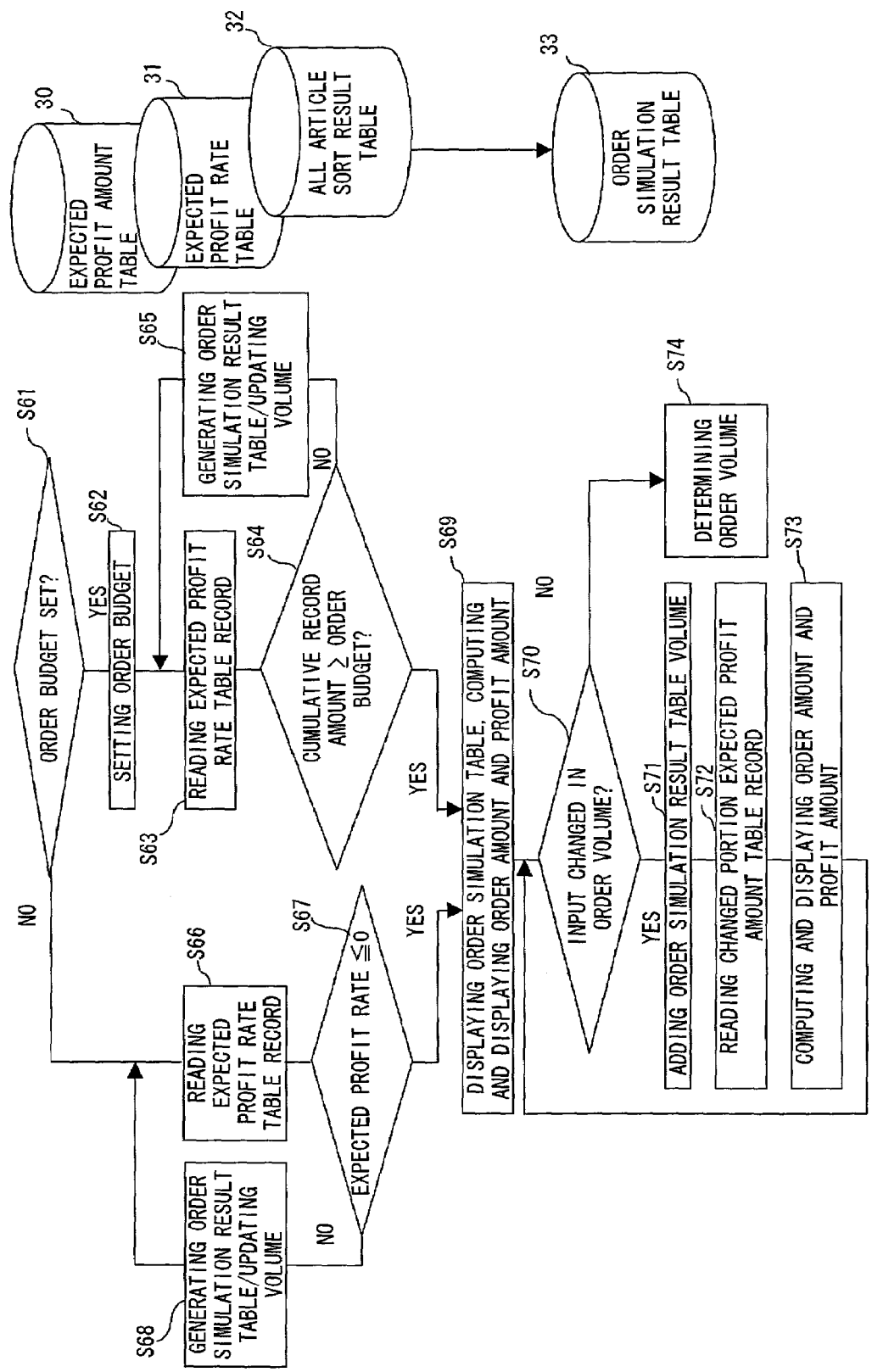
FIG. 20 is a flowchart for explanation of the order simulation process of the process G.

FIG. 20 is a flowchart of the order simulation process of the process G 57.

First, the user is to determine/input what the user requests in the process is an ordering method for obtaining the largest profit within the order budget, or an ordering method for obtaining the largest profit regardless of the order budget.

Within the order budget (YES in step S61), the user, etc. is to set/input the order budget (step S62).

Then, the records are sequentially read one by one from the head of the all articles sort result table 32 (that is, from the record having the highest expected profit rate) generated in the process F 56 (step S63 and its loop), and the order simulation result tables are sequentially generated (step S65). These processes are repeated until the record whose value of the cumulative order amount 118 of the read records reaches the order budget (YES in step S64) appears.

For example, in this example, assuming that the order budget is 1,000 yen, and using the example shown in FIG.

19, the cumulative order amount of the first record is 130 yen. Therefore, the determination in switch S64 is 'NO', thereby passing control to the process in step S65. In step S65, the order simulation result table 33 is sequentially generated by adding the record to the order simulation result table 33 generated before. At this time, the value of the 'n-th ordered piece' 116 of the record is set to an optimum order volume 126. If the record of the same article as the current article exists in the order budget frame, and the process in step S65 is performed, then using the n-th ordered piece 116 of the record, the value of the optimum order volume 126 is updated.

Then, back in the process in step S63, the next record is read, and the similar processes are performed. In the example shown in FIG. 19, in the process of the record of the article 'lunch box A', the cumulative record amount (=1, 420)≧order budget (YES in step S64), thereby passing control to the process in step S69.

On the other hand, since the processes of obtaining the ordering method for expecting the largest profit regardless of the order budget (steps S66, S67, and S68) are similar to the processes in steps S63, S64, and S65 except they are different in condition of transfer to the process in step S69 (that is, the process is repeated until the record of the expected profit rate equal to or lower than 0 appears). Therefore, the detailed explanation is omitted here.

Since the order simulation result table 33 is generated in the process in step S65 up to the record immediately before the record of the article 'lunch box A', it is displayed. The total value of the expected profit amount (total expected profit amount of the first delivery in this example) is obtained using the expected profit amount table 30. Since the total order amount can also be obtained, they are displayed together with the order simulation result table 33.

Figure 22:
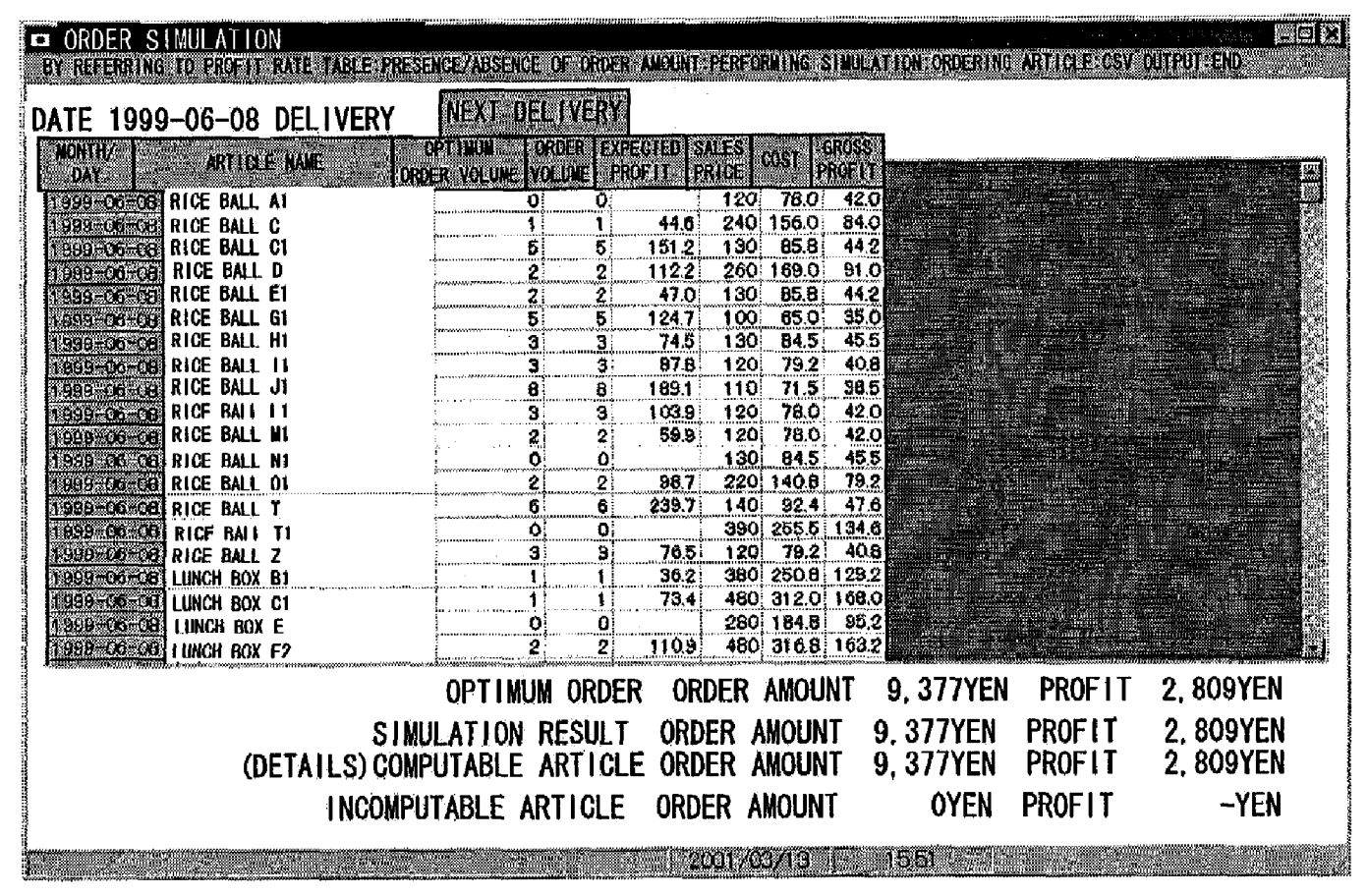

FIG. 22 shows an example of the display. However, in this stage, the order amount and profit corresponding to the optimum order volume 126 are computed/displayed, but the order amount and profit corresponding to the simulation results have not been computed/displayed. Then are described later.

FIG. 21 shows an example of the order simulation result table 33.

The order simulation result table 33 shown in FIG. 21 comprises the items of a delivery name 121, an article name 122, a sales price 123, a cost 124, a gross profit 125, the optimum order volume 126, and an actual order volume 127.

The detailed explanations of the delivery name 121, the article name 122, the sales price 123, the cost 124, and the gross profit 125 are omitted here.

The optimum order volume 126 is described above. In the articles having the records before the record of the article 'lunch box A', the optimum order volume of the articles 'rice ball D' and 'rice ball B' having the records of the n-th order piece of 2 is 2, and the optimum order volume of other articles is 1. It is obvious that the article 'lunch box A' and the article having the expected profit rate of the first ordered piece is lower than that of the article 'lunch box A' is excluded from the probably ordered articles.

The user can define the article to be ordered which is recommended by the system (which is expected to obtain the largest profit), and the order volume (optimum order volume 126) as the actual order volume, but an arbitrary order volume can be input into the item of the 'actual order volume' 127 shown in FIG. 21 by referring to the above mentioned volume.

That is, at the stage in step S69, no data is input into the item of the actual order volume 127. For example, on the display screen shown in FIG. 22, the user inputs data as necessary.

When the user requests to change an order volume (YES in step S70), the user inputs an arbitrary order volume into the item of the actual order volume 127 on the display screen (step S71).

Thus, for the record for which the order volume has been changed (into which a value different from the value of the optimum order volume 126 is input), the corresponding data is read from the expected profit amount table 30 (step S72), and the total value of the above mentioned expected profit amounts and the total order amount are computed. The computation result is displayed as a simulation result in FIG. 22 (step S73).

The user checks the result, and if the user is not satisfied with the result, then the data of the actual order volume 127 is input again, and the processes in steps S70 through S73 are repeated. Then, if the user is satisfied with the result (NO in step S70), then the actual order volume 127 determines the order volume (step S74).

FIGS. 23A through 23E illustrate the processes of determining the optimum order volume and the actual order volume by generating an order priority table by computing an expected profit rate by referring to a simple example.

In the figures, the target articles are 'lunch box A' and 'lunch box B' only.

In FIG. 23A, the sales price, the purchase price, and the gross profit (obtained in steps S45) of each article, and an example of the total demand volume (sales volume+estimated shortfall) of the sale days (5 days in this example) of the sales days of each target article in the past (in the latest period) by article obtained in step S41. Furthermore, based on this, the average value μ and the variance (standard deviation) σ by article are shown.

FIG. 23B shows a sales probability of each article computed based on the data shown in FIG. 23A. The sales probability indicates (1−Φ (μ, σ, n+J)) obtained in the process of step S45, and indicates the probability of the salability of the n-th piece of the article. Φ (μ, σ, n+J) indicates the cumulative probability density as described above.

FIG. 23C shows an example of the expected profit rate table 31 in which only the 'lunch box A' and the 'lunch box B' are obtained as targets. In this example, the values of the first through ninth ordered pieces are obtained.

When the values are sorted in order from the highest expected profit rate, an order priority table as shown in FIG. 23D is generated. According to each numeric value of the expected profit rate shown in FIG. 23C, the data is sorted in order from the highest order as shown in FIG. 23D, that is, the first ordered piece of the lunch box A, the second ordered piece of the lunch box A, the third ordered piece of the lunch box A, the fourth ordered piece of the lunch box A, the first ordered piece of the lunch box B, the second ordered piece of the lunch box B, . . . As shown in FIG. 23D, if the same expected profit rates exist, the article having a smaller value of n indicating the n-th ordered piece is assigned a higher order.

In this example, assuming YES in step S61 shown in FIG. 20, and that the order budget is set as 1500 yen in step S62, the sixth record in FIG. 23D (the second ordered record of the lunch box B) is read, the determination is YES when the determination in step S64 shown in FIG. 20, and the contents of the order simulation result table 33 generated in the process in step S65 using the preceding records (that is, the first through the fifth records) are as shown in FIG. 23E.

That is, the optimum order volumes in this case are 4 for the lunch box A, and 1 for the lunch box B (in FIG. 23C, in a set of 5 ordered pieces, the optimum combination is four lunch boxes A and one lunch box B (indicating the largest sum of expected profit rates), thereby obtaining the optimum profit-making order volume.

In this example, if the user who checks the display of the optimum order volume sets the order budget of 1500 yen, but requests to order a total of 6 lunch boxes, then the actual order volume is four lunch boxes A, and two lunch boxes B.

On the other hand, if NO in step S61 shown in FIG. 20, there is no limitations of a order budget, and an order volume is obtained for the highest possible profit, then the order simulation result table 33 is generated using the first through the seventh records. Therefore, the optimum order volumes in this example are four lunch boxes A and three lunch boxes B.

In the above mentioned method, only the highest profit is pursued regardless of the article category. Therefore, in an extreme example, only lunch boxes can be ordered and no rice balls can be ordered. However, since it is not a good business method, and an order volume limit (or order amount limit) is set for each of lunch boxes, rice balls, etc., and the volume exceeding the limit can be transfer to any of the order volumes of other articles.

Practically, articles are frequently amended or deleted. In the above mentioned explanation, a new article is not a target article (obviously because there is no preceding sales data). Since the order volume of a new article is determined normally by an instruction of the head office (otherwise, the manager of each store can independently determine), the order volume of a new article is determined in advance. Therefore, in this case, the number obtained by reducing the order volume of the new article can be distributed between, for example, the above mentioned lunch box A and the lunch box B (for example, the order budget set and input as described above can be obtained by 'original order budget−order amount of new article').

Furthermore, the computation of the optimum order volume depending on the above mentioned order budget is especially effective when the purchase amount fluctuates by an external factor. For example, when the number of customers is assumed to fluctuate by an external factor such as a change in weather (a typhoon, heavy snowfall, etc.), an event in the neighborhood (cherry-blossom viewing, road constructions, etc.), it is necessary to change the total purchase amount, and is also necessary to adjust the volume of each article depending on the total purchase amount. In the system according to the embodiment of the present invention, since the optimum order volume is suggested depending on the fluctuation of the total purchase amount (order budget), the volume of each article can be appropriately adjusted.

In addition, by using this system, each store can improve its profit, the improved profit can be the funds to extend the order budget and realize the optimization of an article ordering operation, the optimization extends sales opportunities and finally improves the sales, thereby probably entering a desired process cycle.

FIG. 24 shows an example of the configuration of the hardware of the information processing device for realizing the daily delivered articles order optimization support system according to an embodiment of the present invention.

An information processing device 130 shown in FIG. 24 comprises a CPU 131, memory 132, an input device 133, an output device 134, an external storage device 135, a medium drive device 136, a network connection device 137, etc., and these devices are connected through a bus 138. The configuration shown in FIG. 24 is an example, and is not limited to this application.

The CPU 131 is a central processing unit for controlling the entire information processing device 130.

The memory 132 is memory such as RAM, etc. temporarily storing a program or data stored in the external storage device 135 (or a portable storage medium 139) when the program is executed, data is updated, etc. The CPU 131 executes the above mentioned various processes using the program/data read to the memory 132.

The input device 133 is, for example a keyboard, a mouse, etc., and the configuration for use by a user in inputting data on, for example, the setting screen, etc. shown in FIG. 3.

The output device 134 can be a display, etc., and displays, for example, a setting screen, the above mentioned various tables in or as a result of a process.

The external storage device 135 can be, for example, a magnetic disk device, an optical disk device, a magneto-optical disk device, etc. The device stores a program, etc. for realizing various functions as the above mentioned daily delivered articles order optimization support system by performing the above mentioned various processes.

The medium drive device 136 reads a program/data, etc. stored in the portable storage medium 139. The portable storage medium 139 can be, for example, an FD (floppy disk), CD-ROM, a DVD, a magneto-optical disk, etc.

The network connection device 137 is connected to a network, and, for example, inputs necessary data from the database 10 of each store or the head office, and outputs the ordered contents to the order system 34.

Figure 25:
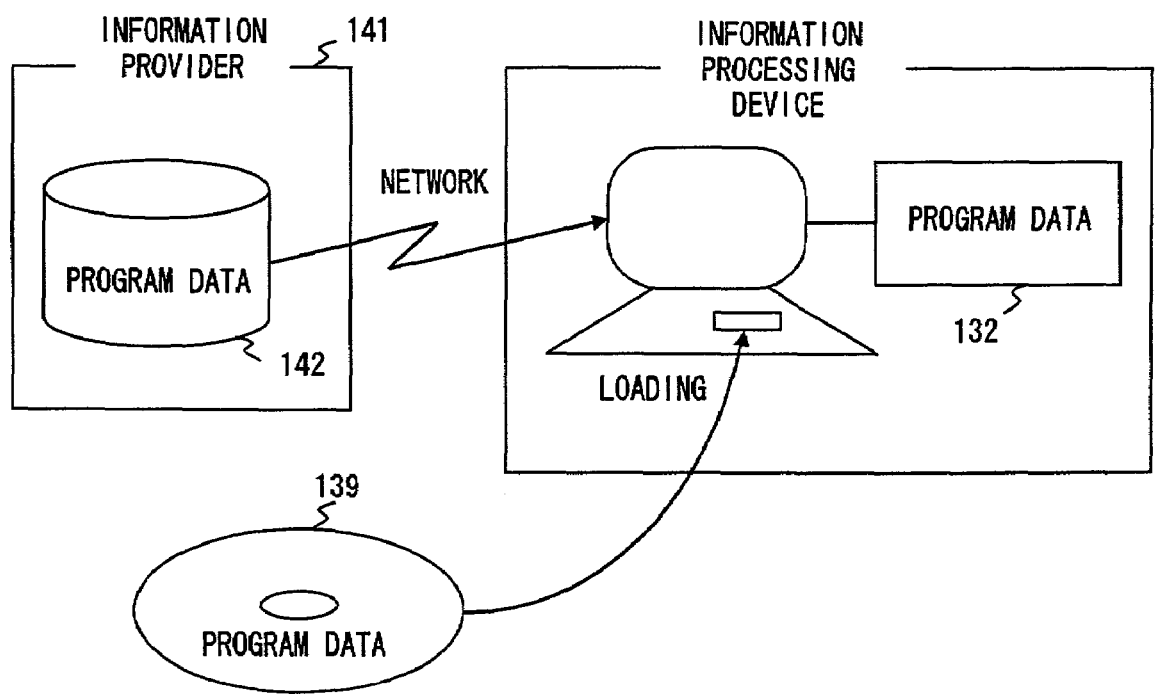
FIG. 25 shows a storage medium.

FIG. 25 shows an example of a storage medium.

As shown in FIG. 25, the above mentioned program/data loads the program/data, etc. stored in the portable storage medium 139 into the information processing device, stores and executes them in the memory 132. The program/data can be obtained by downloading the program/data stored in a device 141 of an external information provider and a storage device 142 through a network (Internet, etc.) connected through the network connection device 137.

Thus, the present invention can be configured as a storage medium storing the program, and can also be configured as a transmission signal transmitting through the network.

As described above, according to the daily delivered articles order optimization support system and method according to the present invention, the optimum profit-making order pattern (volume of each article to be ordered) is presented, an easy and appropriate order can be determined based on the pattern, a loss of sales opportunities can be reduced, and top sellers and shelf warmers can be appropriately managed.

What is claimed is:

1. A daily delivered articles order optimization support system, comprising:
an expected-profit-sequenced order priority generation unit computing an expected profit of each piece of article up to a specified number for each article based on sales result data in a latest period of the past, and sorting articles in order from a highest expected profit in computation results of all articles; and
an optimum order pattern computation unit computing an optimum order pattern based on a process result of said expected-profit-sequenced order priority generation unit, said expected-profit-sequenced order priority generation unit obtains a cumulative probability density of each piece of a specified number of pieces of each article when a total sales or a total demand value of each day obtained from the sales result data for each article is assigned as a normal distribution with an average μ and a standard deviation σ to a cumulative normal distribution function, and computes the expected profit by the cumulative probability density and a cost, a gross profit, and a sales price of each article.

2. The system according to claim 1, further comprising:
a sales share analysis unit obtaining a sales share by time period based on sales result data in a latest period of the past; and
an estimated shortfall computation unit computing an estimated shortfall by time period for each article based on the sales share by time period, the sales result data in the latest period of the past, a delivery volume of each article in each delivery, and a set delivery time or discard time of each delivery, wherein
said expected-profit-sequenced order priority generation unit computes the expected profit based on the sales result data and the estimated shortfall by time period.

3. The system according to claim 1, wherein
said expected profit can be computed with an estimated carry-over from a previous delivery computed at the time of the previous delivery taken into account.

4. The system according to claim 1, further comprising:
a day of week characteristic analysis unit determining whether a sales characteristic depends on holiday or weekday, or any day of a week based on sales result data in a latest period of the past, wherein
if said week-of-day characteristic analysis unit determines that the sales characteristic depends on a holiday or a weekday, or any day of a week, then said expected-profit-sequenced order priority generation unit or said estimated shortfall computation unit performs a process based on sales result data in the latest period of the past by holiday or weekday, or any day of a week, and/or based on a sales share by time period.

5. The system according to claim 1, further comprises:
an order simulation unit computing and displaying a total order amount and a total profit amount depending on an optimum order pattern computed by said optimum order pattern computation unit, and computing and displaying a total order amount and a total profit amount depending on an input actual order volume.

6. A daily delivered articles order optimization support method, comprising:
computing an expected profit of each piece of article up to a specified number for each article based on sales result data in a latest period of the past;
sorting articles in order from a highest expected profit in the computation results of all articles; and
computing an optimum order pattern based on the sorting result, wherein
said computing an optimum order pattern based on the sorting result obtains a cumulative probability density of each piece of a specified number of pieces of each article when a total sales or a total demand value of each day obtained from the sales result data for each article is assigned as a normal distribution with an average μ and a standard deviation σ to a cumulative normal distribution function, and computes the expected profit by the cumulative probability density and a cost, a gross profit, and a sales price of each article.

7. A computer-readable storage medium storing a program used to direct a computer to perform the functions of:
computing an expected profit of each piece of article up to a specified number for each article based on sales result data in a latest period of the past;
sorting articles in order from a highest expected profit in the computation results of all articles; and
computing an optimum order pattern based on the sorting result, wherein
said computing an optimum order pattern based on the sorting result obtains a cumulative probability density of each piece of a specified number of pieces of each article when a total sales or a total demand value of each day obtained from the sales result data for each article is assigned as a normal distribution with an average μ and a standard deviation σ to a cumulative normal distribution function, and computes the expected profit by the cumulative probability density and a cost, a gross profit, and a sales price of each article.

8. A computer data signal embodied in a carrier wave storing a computer program used to direct a computer to perform the functions of:
computing an expected profit of each piece of article up to a specified number for each article based on sales result data in a latest period of the past;
sorting articles in order from a highest expected profit in the computation results of all articles; and
computing an optimum order pattern based on the sorting result, wherein
said computing an optimum order pattern based on the sorting result obtains a cumulative probability density of each piece of a specified number of pieces of each article when a total sales or a total demand value of each day obtained from the sales result data for each article is assigned as a normal distribution with an average μ and a standard deviation σ to a cumulative normal distribution function, and computes the expected profit by the cumulative probability density and a cost, a gross profit, and a sales price of each article.

9. A daily delivered articles order optimization support system, comprising:
an expected-profit-sequenced order priority generation means for computing an expected profit of each piece of article up to a specified number for each article based on sales result data in a latest period of the past, and sorting articles in order from a highest expected profit in computation results of all articles; and
an optimum order pattern computation means for computing an optimum order pattern based on a process result of said expected-profit-sequenced order priority generation means,
wherein said expected-profit-sequenced order priority generation means obtains a cumulative probability density of each piece of a specified number of pieces of each article when a total sales or a total demand value of each day obtained from the sales result data for each article is assigned as a normal distribution with an average μ and a standard deviation σ to a cumulative normal distribution function, and computes the expected profit by the cumulative probability density and a cost, a gross profit, and a sales price of each article.

* * * * *